United States Patent
Olivier et al.

(10) Patent No.: US 9,961,166 B2
(45) Date of Patent: May 1, 2018

(54) ORGANIZATIONAL DIRECTORY ACCESS CLIENT AND SERVER LEVERAGING LOCAL AND NETWORK SEARCH

(71) Applicant: Microsoft Technology Licensing, LLC, Redmond, WA (US)

(72) Inventors: Michael Olivier, Belmont, CA (US); Carleton Miyamoto, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 211 days.

(21) Appl. No.: 14/927,363

(22) Filed: Oct. 29, 2015

(65) Prior Publication Data

US 2017/0034313 A1  Feb. 2, 2017

Related U.S. Application Data

(60) Provisional application No. 62/199,380, filed on Jul. 31, 2015.

(51) Int. Cl.
H04L 29/08 (2006.01)
H04L 29/06 (2006.01)
(Continued)

(52) U.S. Cl.
CPC ........ H04L 67/42 (2013.01); G06F 17/30528 (2013.01); G06F 17/30554 (2013.01);
(Continued)

(58) Field of Classification Search
CPC ......... G06F 17/30867; G06F 17/30905; G06F 17/30528; G06F 17/30554;
(Continued)

(56) References Cited

U.S. PATENT DOCUMENTS

2004/0068477 A1  4/2004  Gilmour et al.
2006/0004713 A1  1/2006  Korte et al.
(Continued)

FOREIGN PATENT DOCUMENTS

WO  WO-2013109524 A1  7/2013
WO  WO-2017023448 A1  2/2017

OTHER PUBLICATIONS

"International Application Serial No. PCT/US2016/039608, International Search Report dated Aug. 23, 2016", 4 pgs.
(Continued)

*Primary Examiner* — Le H Luu
(74) *Attorney, Agent, or Firm* — Schwegman Lundberg & Woessner, P.A.

(57) ABSTRACT

This disclosure is directed to an organizational directory access client and an organizational directory server and, in particular, to an organizational directory access client that performs a local search and a network search for one or more member profiles of members of the organization. The organizational directory access client executes on a client device and is configured to authenticate a user of the client with the organizational directory server. Once authenticated, the client device receives a member profile database that is then made locally available. As the user enters a search query, the organizational directory access client searches the local member profile database and, when the search query is completed, the organizational directory access client communicates the search query to the organizational directory server for performing a search across one or more social networking services. The local and network search results are then displayed for review by the user.

20 Claims, 22 Drawing Sheets

(51) Int. Cl.
*G06F 17/30* (2006.01)
*G06Q 10/06* (2012.01)
*G06Q 10/10* (2012.01)
*G06Q 50/00* (2012.01)

(52) U.S. Cl.
CPC .. *G06F 17/30569* (2013.01); *G06F 17/30867* (2013.01); *G06Q 10/06* (2013.01); *G06Q 10/10* (2013.01); *G06Q 50/01* (2013.01); *H04L 67/30* (2013.01); *H04L 67/306* (2013.01)

(58) Field of Classification Search
CPC ............ G06F 17/30569; G06N 99/005; G06Q 10/1053; G06Q 50/01; G06Q 10/10; G06Q 10/06; H04L 12/185; H04L 51/04; H04L 67/306; H04L 67/42; H04L 67/30
See application file for complete search history.

(56) References Cited

U.S. PATENT DOCUMENTS

| | | |
|---|---|---|
| 2013/0268373 A1 | 10/2013 | Grishaver |
| 2014/0040285 A1 | 2/2014 | Rubinstein et al. |
| 2014/0222702 A1 | 8/2014 | Jennings |
| 2014/0244530 A1 | 8/2014 | Baldwin et al. |
| 2014/0379723 A1 | 12/2014 | Page et al. |
| 2016/0241671 A1* | 8/2016 | Goel ................... H04L 67/306 |
| 2016/0292161 A1* | 10/2016 | Liu ..................... G06Q 10/1053 |
| 2016/0292793 A1* | 10/2016 | Burstein ........... G06F 17/30905 |
| 2016/0321309 A1* | 11/2016 | Hu ..................... G06F 17/30867 |
| 2016/0321761 A1* | 11/2016 | Lytkin ................... G06Q 50/01 |
| 2016/0352530 A1* | 12/2016 | Andrews ............... H04L 12/185 |
| 2016/0352861 A1* | 12/2016 | White ................... H04L 67/306 |
| 2016/0373383 A1* | 12/2016 | Pinkovezky ............ H04L 51/04 |
| 2017/0004450 A1* | 1/2017 | Rathod .............. G06Q 10/1053 |
| 2017/0004451 A1* | 1/2017 | Gune ................. G06Q 10/1053 |
| 2017/0004455 A1* | 1/2017 | Tang ................. G06Q 10/1053 |
| 2017/0031998 A1 | 2/2017 | Olivier et al. |
| 2017/0032275 A1* | 2/2017 | Lytkin ................. G06N 99/005 |

OTHER PUBLICATIONS

"International Application Serial No. PCT/US2016/039608, Written Opinion dated Aug. 23, 2016", 7 pgs.

"U.S. Appl. No. 14/927,348, Non Final Office Action dated Nov. 3, 2017", 25 pgs.

* cited by examiner

ORGANIZATIONAL DIRECTORY ACCESS CLIENT AND SERVER LEVERAGING LOCAL AND NETWORK SEARCH

CROSS-REFERENCE TO RELATED APPLICATIONS

This application claims the benefit of priority to U.S. Pat. App. No. 62/199,380, titled "ORGANIZATIONAL DIRECTORY ACCESS CLIENT AND SERVER LEVERAGING LOCAL AND NETWORK SEARCH" and filed Jul. 31, 2015, the disclosure of which is hereby incorporated by reference in its entirety.

TECHNICAL FIELD

The subject matter disclosed herein generally relates to systems and methods for creating an organizational directory of user profiles and, in particular, to creating an organizational directory of user profiles that is transferred to a client device that leverages local and network search methodologies to find one or more user profiles satisfying a provided input search query.

BACKGROUND

Online social networking services provide users with a mechanism for defining, and memorializing in a digital format, their relationships with other people. This digital representation of real-world relationships is frequently referred to as a social graph. Many social networking services utilize a social graph to facilitate electronic communications and the sharing of information between its users or members. For instance, the relationship between two members of a social networking service, as defined in the social graph of the social networking service, may determine the access and sharing privileges that exist between the two members. As such, the social graph in use by a social networking service may determine the manner in which two members of the social networking service can interact with one another via the various communication and sharing mechanisms supported by the social networking service.

The members of a social networking service may be employed by, or affiliated with, an organization, such as a corporation, a limited liability company, non-profit entity, club, or other such organization. The organization may have information about the members that is valuable within the organization, and that the organization would prefer remain within the organization. The members of the organization may desire to find information about each other, such as from the organization and from the social networking service. However, the social networking service typically does not have access to the information maintained by the organization. Therefore, it can be difficult for a member of an organization to find information about an organization's members.

BRIEF DESCRIPTION OF THE DRAWINGS

Some embodiments are illustrated by way of example and not limitation in the figures of the accompanying drawings.

DETAILED DESCRIPTION

Figure 1:
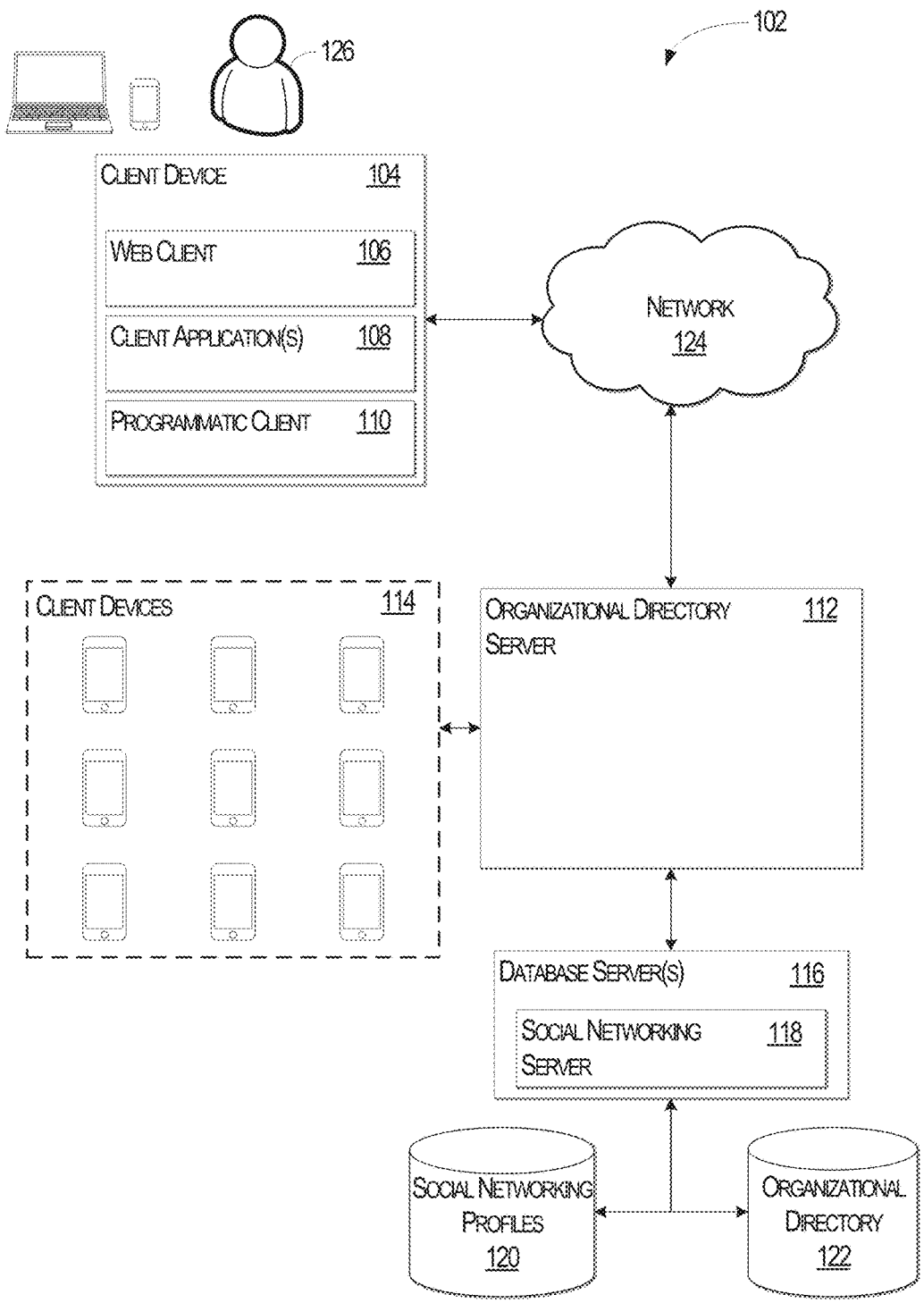
FIG. 1 is a block diagram illustrating a networked system, according to some example embodiments.

Example methods and systems are directed to an organizational directory access client and server that leverage a local and network search strategies to find user profiles matching an input search query. In one embodiment, the disclosed embodiments include a client-server architecture where an organizational directory server communicates with various client devices. Each of the client devices include an organizational directory access client, either integrated into the operating system or downloadable from a website that facilitates access to, and communication with, the organizational directory server.

The organizational directory server includes various components that facilitate access to, and communication with, the social networking service and an organization's database of users. An organization will typically maintain a database of user profiles that include information about the organization's members that is often unavailable to users who are not members of the organization. In one embodiment, when the client device communicates with the organizational directory server via the organizational directory access client, the organizational directory server provides a local database of user profiles to the client device that includes a subset of the user profile information obtained from the organization's database for those users who have also elected to use the organizational directory access client. In another embodiment, the organizational directory server provides a local database of user profiles to the client device that includes a subset of the user profile information obtained from the organization's database for one or more members of the organization, regardless of whether the member has elected to use the organizational directory access client.

With the organizational directory access client, a member of the organization can conduct a search for one or more member profiles matching a provided search query. In one embodiment, the organizational directory access client leverages technologically distinct search methodologies for providing search results. In particular, the organizational directory access client uses a local search strategy that searches the local database provided by the organizational directory server given a partial search query (e.g., the first letter of a word). This local search strategy is fast relative to other types of searches and provides a near-immediate listing of search results to the user. In addition, the organizational directory access client uses a network search strategy where the organizational directory access client communicates a more complete (e.g., an entire word) search query to the organizational directory server or other designated search server (e.g., a social networking server). The network search strategy has the benefit of finding search results for members that may not have registered with the organizational directory server or finding profile information that is not maintained by the organization (e.g., an employment or education history).

In this manner, the organizational directory access client and the organizational directory server provide search results for member profiles that is more complete than searching the organization's database or the social networking service individually. Furthermore, as the organizational directory access client leverages a locally stored database of member profiles, the organizational directory access client can conduct a search faster with a partial search query than if the search were conducted via a network connection. However, as the organizational directory access client also leverages a network search, the results of which may include results not found through the local search but are nonetheless integrated with the local search. Thus, the disclosed systems and methods have the technical benefit of providing multiple search strategies from a single application, which increases the likelihood that a relevant or desired search result is obtained.

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

With reference to FIG. 1, an example embodiment of a high-level client-server-based network architecture 102 is shown. An organizational directory server 112 provides server-side functionality via a network 124 (e.g., the Internet or wide area network (WAN)) to one or more client devices 104. FIG. 1 illustrates, for example, a web client 106 (e.g., a browser, such as the Internet Explorer® browser developed by Microsoft® Corporation of Redmond, Wash. State), an application 108, and a programmatic client 110 executing on client device 104. The organizational directory server 112 further communicates with other client devices 114 that have registered with the organizational directory server 112 and one or more database servers 116 that provide access to one or more databases 120-122.

The client device 104 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, or any other communication device that a user 126 may utilize to access the organizational directory server 112. In some embodiments, the client device 104 may comprise a display module (not shown) to display information (e.g., in the form of user interfaces). In further embodiments, the client device 104 may comprise one or more of a touch screens, accelerometers, gyroscopes, cameras, microphones, global positioning system (GPS) devices, and so forth. The client device 104 may be a device of a user 126 that is used to perform one or more searches for user profiles accessible to, or maintained by, the organizational directory server 112.

In one embodiment, the organizational directory server 112 is a network-based appliance that responds to initialization requests or search queries from the client device 104 and/or the client devices 114. One or more users 126 may be a person, a machine, or other means of interacting with client device 104. In embodiments, the user 126 is not part of the network architecture 102, but may interact with the network architecture 102 via client device 104 or another means. For example, one or more portions of network 124 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 104 may include one or more applications (also referred to as "apps") such as, but not limited to, a web browser, messaging application, electronic mail (email) application, an organizational directory server access client, and the like. In some embodiments, if the organizational directory server access client is included in the client device 104, then this application is configured to locally provide the user interface and at least some of the functionalities with the application configured to communicate with the organizational directory server 112, on an as needed basis, for data and/or processing capabilities not locally available (e.g., access to a database of items available for sale, to authenticate a user 126, to verify a method of payment, etc.). Conversely if the organizational directory server access client is not included in the client device 104, the client device 104 may use its web browser to access the initialization and/or search functionalities of the organizational directory server 112.

One or more users 126 may be a person, a machine, or other means of interacting with the client device 104. In example embodiments, the user 126 is not part of the network architecture 102, but may interact with the network architecture 102 via the client device 104 or other means. For instance, the user 126 provides input (e.g., touch screen input or alphanumeric input) to the client device 104 and the input is communicated to the networked system 102 via the network 120. In this instance, the organizational directory server 112, in response to receiving the input from the user 126, communicates information to the client device 104 via the network 120 to be presented to the user 126. In this way, the user 126 can interact with the organizational directory server 112 using the client device 104.

Further, while the client-server-based network architecture 102 shown in FIG. 1 employs a client-server architecture, the present subject matter is of course not limited to such an architecture, and could equally well find application in a distributed, or peer-to-peer, architecture system, for example.

In addition to the client device 104, the organizational directory server 112 communicates with other client devices 114 and one or more database server(s) 116 and/or database (s) 120-122. As discussed below with reference to FIGS. 2-3, the organizational directory server provides a local database of member profiles for the client device 104 to use in performing a local search of member profiles. However, in one embodiment, the local database of user profiles includes only those members of the organization which have registered with the organizational directory server 112 with respective client devices 114. In this manner, a member's member profile is locally searchable to the extent that the corresponding member has "opted-in" (e.g., registered with) the organizational directory server 114. The benefit to registering, of course, is that the registering member is given access to member profiles for members that have also registered. In an alternative embodiment however, the organizational directory server provides a local database of member profiles that includes all members of the organization, regardless of whether a given member has registered with the organizational directory server 114. In this embodiment, one or more of the functionalities of the organizational directory access client may be disabled when a member profile is selected, such as a chat feature or direct message feature.

The database server(s) 116 provide access to one or more member profiles, which include member profiles of an organization and member profiles of one or more social networking services. The organization member profiles may be stored in an organizational directory database 122 and the social networking profiles may be stored in a social networking profile database 120. Accordingly, FIG. 1 illustrates that the database server(s) 116 include a social networking server 118, which may provide access to one or more of the social networking profile databases 120 via an Application Programming Interface ("API"), REST-Oriented Architecture ("ROA"), Service-Oriented Architecture ("SOA"), any other networking architecture, or combinations thereof.

While the database server(s) 116 are shown to include the social networking server 118, one of ordinary skill in the art will recognize that other servers may also be included in the database server(s) 116. For example, the organization may implement one or more servers configured to provide user profile information including, but not limited to, a Microsoft® Exchange Server, a Microsoft® Sharepoint® Server, a Lightweight Directory Access Protocol ("LDAP") server, any other server configured to provide user profile information, or combinations thereof. Accordingly, and in one embodiment, the servers implemented by the organization and configured to access the organizational directory database 122 are further configured to communicate with the organizational directory server 116.

The organizational directory database 122 includes member profiles that have member information specific to the organization. For example, the organization's member profiles may include such information as an organization's e-mail address, an organization's phone number (e.g., the member's phone number at the organization), an emergency contact number for the member (e.g., a cellular phone number), or other such organization information. This information is typically collected by the organization when the member is brought into the organization (e.g., hired) or is voluntarily provided by the member while he or she is employed or affiliated with the organization. Furthermore, this information is typically not available to public users and resides behind one or more firewalls established by the organization. As discussed below with reference to FIGS. 2-3, the organizational directory server and organizational directory access client employ several different security mechanisms to ensure that such information is not made available to non-members of the organization.

While the organizational directory database 122 provides member profile information for members of the organization, the social networking database 120 provides member profile information for members of the social networking service. The social networking server 118 stores information in the social networking profile database 120 related to individual or organizational members of the social networking service, such as in the form of user characteristics corresponding to individual users of the social networking service. For instance, for an individual user, the user's characteristics may include one or more profile data points, including, for instance, name, age, gender, profession, prior work history or experience, educational achievement, location, citizenship status, leisure events, likes and dislikes, and so forth. The user's characteristics may further include behavior or events within and without the social networking, as well as the user's social graph.

In addition, a user 126 and/or member may identify an association with an organization (e.g., a corporation, government entity, non-profit organization, etc.), and the social networking server 118 may be configured to group the user profile and/or member profile according to the associated organization. As discussed below with reference to FIGS. 2-3, and in one embodiment, the association with the organization is leveraged by the organizational directory server 112 to identify those members of the organization that have a social networking presence (e.g., one or more social network profiles with the social networking service), but have not yet registered with the organizational directory server 112. In one embodiment, the social networking profile information is available to non-members of the social networking service. In another embodiment, a selected portion of the social networking profile information is made available.

Figure 2:
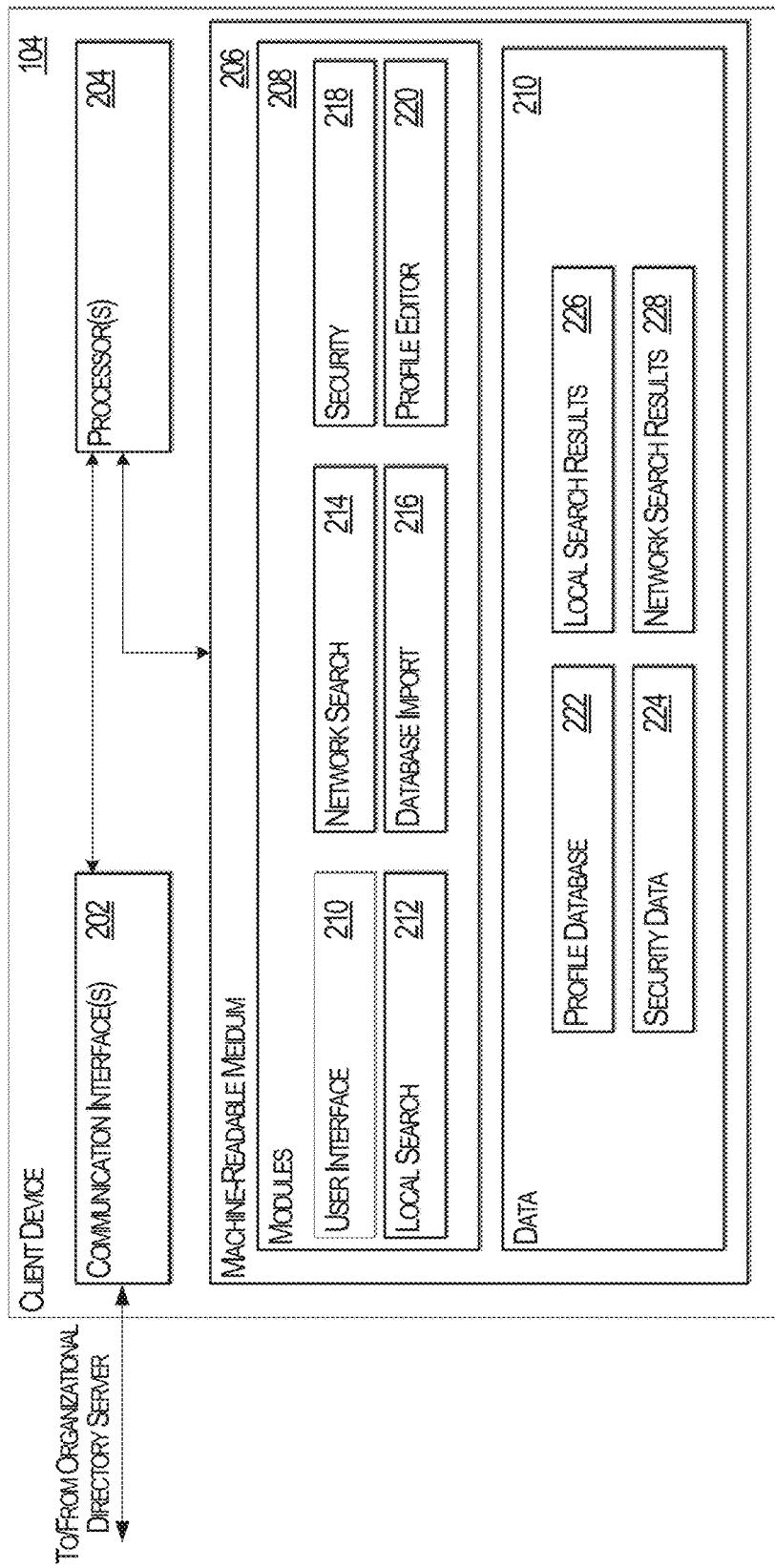
FIG. 2 illustrates the client device of FIG. 1 in accordance with an example embodiment.

FIG. 2 illustrates the client device 104 of FIG. 1 in accordance with an example embodiment. In one embodiment, the client device 104 may include one or more processor(s) 204, one or more communication interface(s) 202, and a machine-readable medium 206 that stores computer-executable instructions for one or more modules(s) 208 and data 210 used to support one or more functionalities of the modules 208.

The various functional components of the client device 104 may reside on a single device or may be distributed across several computers in various arrangements. The various components of the client device 104 may, furthermore, access one or more databases (e.g., databases 120-122 or any of data 210), and each of the various components of the client device 104 may be in communication with one another. Further, while the components of FIG. 2 are discussed in the singular sense, it will be appreciated that in other embodiments multiple instances of the components may be employed.

The one or more processors 204 may be any type of commercially available processor, such as processors available from the Intel Corporation, Advanced Micro Devices, Texas Instruments, or other such processors. Further still, the one or more processors 204 may include one or more special-purpose processors, such as a Field-Programmable Gate Array (FPGA) or an Application Specific Integrated Circuit (ASIC). The one or more processors 204 may also include programmable logic or circuitry that is temporarily configured by software to perform certain operations. Thus, once configured by such software, the one or more processors 204 become specific machines (or specific components of a machine) uniquely tailored to perform the configured functions and are no longer general-purpose processors.

The one or more communication interfaces 202 are configured to facilitate communications between the client device 104, the organizational directory server 112, and one or more of the database server(s) 116 and/or database(s) 120-122. The one or more communication interfaces 202 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combination of such wired and wireless interfaces.

The machine-readable medium 206 includes various modules 208 and data 210 for implementing the organizational directory access client of the client device 104. The machine-readable medium 206 includes one or more devices configured to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the modules 208 and the data 210. Accordingly, the machine-readable medium 206 may be implemented as a single storage apparatus or device, or, alternatively and/or additionally, as a "cloud-based" storage systems or storage networks that include multiple storage apparatus or devices. As shown in FIG. 2, the machine-readable medium 206 excludes signals per se.

In one embodiment, the modules 208 are written in a computer-programming and/or scripting language. Examples of such languages include, but are not limited to, C, C++, C#, Java, JavaScript, Perl, Python, or any other computer programming and/or scripting language now known or later developed.

With reference to FIG. 2, the modules 208 of the organizational directory access client include, but are not limited to, a user interface module 210, a local search module 212, a network search module 214, a database import module 216, a security module 218, and a profile editor module 220. The data 210 supporting these modules 208 include, but is not limited to, a local profile database 222, security data 224, one or more local search results 226, and one or more network search results 228.

The user interface module 210 is configured to provide a user interface for receiving input by a user 126 of the client device 104. In one embodiment, the user interface module 210 implements a graphical user interface that receives tactile input from a user 126 for interacting with the organizational directory access client. In addition, the user interface module 210 provides images, texts, menus, selectable images (e.g., buttons, radio buttons, check boxes, icons, etc.), input elements (e.g., one or more text boxes) for interacting with the client device 104. Furthermore, the user interface module 210 provides multiple graphical user interfaces depending on the context of information being provided. For example, and as discussed below with references to FIGS. 5-15, the graphical user interfaces may include an initial graphical user interface, security interfaces for authenticating a user 126 of the client device 104, search interfaces for receiving search queries and displaying search results, profile interfaces for displaying member profiles and/or editing a member profile, and other similar user interfaces. In one embodiment, the user interface module 210 communicates with the various other modules 212-220 and retrieves data 210 for displaying the various interfaces.

Although the user interface module 210 is discussed as implementing one or more graphical user interfaces, other types of user interfaces are also contemplated. For example, in alternative embodiments, the user interface module 210 implements one or more command line interfaces, one or more audio-based interfaces (e.g., voice command interfaces), haptic feedback interfaces, any other type of user interface, and combination of such interfaces.

The security module 218 implements the various security features of the organizational directory access client. In one embodiment, the security module 218 implements a two-factor authentication scheme whereby the user 126 of the client device 104 is requested to provide authentication credentials for one or more social networking services, and is then later requested to verify his or her identity with the organizational directory server 112. Accordingly, in one embodiment, the security module 218 initially requests that the user 126 provide the authentication credentials for the one or more social networking services, such as a username and password. In one embodiment, the authentication credentials for the one or more social networking services are stored as security data 224.

When entered into the client device 104, the security module 218 communicates the provided authentication credentials to the organizational directory server 112 and/or the social networking server 118. In one embodiment, the security module 218 is configurable such that a user 126 of the client device 104 can indicate which social networking services the security module 218 is to communicate with. For example, the security data 224 may indicate the social networking services available to the client device 104 (e.g., Uniform Resource Locations (URLs), specific port numbers, specific communication protocols (e.g., UDP, TCP, HTTPS, etc.), and other such communication data.)

In an alternative embodiment, the organizational directory server 112 establishes the social networking services available to the client device 104, and the organizational directory server 112 acts as an intermediary (e.g., a gateway) between the client device 104 and the available social networking services. By establishing the organizational directory server 112 as a gateway between the client device 104 and the social networking services, the organization can control those services that are available to the client device 104 and ensure that member profile data obtained from these services is handled appropriately. In one embodiment, the organizational directory server 112 acts as an intermediary by implementing one or more REST-based services that provide such access to the available social networking services.

The security module 218 further implements an identification verification feature that establishes the identity of the user 126 with respect to the organization. In one embodiment, the identification verification feature includes verifying a Personal Identification Number that the security module receives from the user 126 and communicates to the organizational directory server 112. For example, the organizational directory server 112 may be configured to generate the PIN number and send it to a contact point identified by the user 126 and affiliated with the organization, such as an organization email address, an organization cell phone number (e.g., via SMS), a direct message to an organization-provided messaging client, or other such contact point. When the user 126 receives the PIN number and enters it into the client device 104 via one or more user interfaces provided by the user interface module 210, the security module 218 communicates the provided PIN number to the organizational directory server 112. The security module 218 then processes any responses received from the organizational directory server 112, which then determines whether the user 126 of the client device 104 can then access the organizational directory server 112 via the client device 104.

Turning next to the database import module 216, this module 216 is configured to import a local database compiled by the organizational directory server 112 and communicated to the client device 104. The local database provided by the organizational directory server 112 is integrated into the client device 104 as the local profile database 222. In one embodiment, the database import module 216 and the local profile database 222 are implemented as part of the Apple® Core Data framework. As one of ordinary skill in the art will recognize, Apple® Core Data is an object graph and persistence framework and allows data organized by the relational entity-attribute model to be serialized into XML, binary, or SQLite stores. In an alternative embodiment, the database import module 216 is implemented as SQLite for Apple® iOS or Google® Android® and the local profile database 222 is stored as an SQLite-supported file format (e.g., an ".sqlite" file). While the foregoing discussion identifies Apple® Core Data and SQLite as embodiments for the database import module 216 and the local profile database 222, these examples are not meant to be exhaustive, and one of ordinary skill in the art will recognize that alternative database engines and database structures may also be used.

In one embodiment, the local profile database 222 includes one or more member profiles for members affiliated with the organization. In one embodiment, the local profile database 222 includes member profile information obtained from the organizational directory database 122. As discussed below with reference to FIG. 3, the organizational directory server 112 is configured to package the local database for the client device 104. The member profile information included in the local profile database 222 may be a subset of the information stored by the organizational directory database 122. For example, the organizational directory database 122 may have 20-30 different attributes (e.g., fields) for a given member, whereas the local profile database 222 may include 4-5 of those fields (e.g., member name, organization e-mail address, organization phone number, etc.) Thus, the local profile database 222 is, in effect, a customized version of the organizational directory database 122. In alternative embodiments, the organizational directory server 112 packages a local profile database 222 where the member profiles are copied from the organizational directory database 122 such that a selected member profile from the local profile database 222 has a corresponding and/or identical member profile in the organizational directory database 122.

Furthermore, the process for including the one or more member profiles into the local profile database 222 may be selective. For example, in one embodiment, the one or more member profiles are selected according to whether the corresponding member has registered with the organizational directory server 112 (e.g., via the security module 218). In this embodiment, only those members that have registered with the organizational directory server 112 are included in the local profile database 222. In an alternative embodiment, the member profiles included in the local profile database 222 are selected according to an attribute or field of the member profile corresponding to the user 126 using the client device 104. For example, a member profile may have a department field, and member profiles having the same department value (e.g., Quality Assurance, Development, Product Support, etc.) are included in the local profile database 222. As another example, a member profile may have a region field, and member profiles having the same region (e.g., California, United States, Western Hemisphere, Third District, etc.) are included in the local profile database 222. In yet a further embodiment, the member profiles included in the local profile database 222 are all of the member profiles stored in the organizational directory database 122. The foregoing examples are meant to be illustrative, not exhaustive, and one of ordinary skill in the art will recognize that variations and alternatives of the local profile database 222 are possible and contemplated as falling within the scope of this disclosure.

As the personnel of an organization is likely to change over time, the database import module 216 is configured to request or receive a new local profile database 222 at specified intervals or when one or more conditions are satisfied. For example, a condition may be that the local profile database 222 does not exist on the client device 104. This condition is evidently satisfied when the organizational directory server access client is first initialized and a user 126 registers with the organizational directory server 112 for the first time. Another condition may be that a predetermined time period has elapsed since the local profile database 222 was last updated. For example, the predetermined time period may be two weeks, in which case, the local profile database 222 is updated every two weeks. A further condition may be that the organizational directory database 122 has changed or that a predetermined number of changes have occurred to the organizational directory database 122, such as when a member profile is created or deleted. In this example, the organizational directory server 112 is configured to send an update to the client device 104 for the local profile database 222, where the update includes changes (e.g., insertions, deletions, edits of existing member profiles) to the local profile database 222, a new copy of the local profile database 222, or any other such update or combination of updates. In yet another alternative embodiment, the local profile database 222 can be manually updated or, more specifically, the user 126 can initiate an update of the local profile database 222. In a further alternative embodiment, the organizational directory server 112 communicates an unprompted updated database to the client device 104 via the database import module 216, which then imports the updated database as the local profile database 222.

In one embodiment, updating the local profile database 222 includes modifying the local profile database 222 to correspond to the changes made to the organizational directory database 122. In this embodiment, updating the local profile database 222 includes deleting member profiles from the local profile database 222, inserting member profiles into the local profile database 222, and/or modifying specific values of one or more member profiles of the local profile database 222. In an alternative embodiment, updating the local profile database 222 includes replacing the local profile database 222 with a more up-to-date copy obtained or provided from the organizational directory server 122.

Once the user 126 of the client device 104 has registered with the organizational directory server 112 and received a copy of the local profile database 222, the user 126 may desire to make changes to his or her member profile. Accordingly, in one embodiment, the organizational directory access client includes a profile editor module 220 configured to edit the member profile associated with the user 126 of the client device 104. The profile editor module 220 is further configured to communicate with the user interface module 210 to display one or more user interfaces for editing the member profile, which may include, but is not limited to, text boxes, selectable images, non-selectable images, check boxes, radio buttons, and other such graphical user interface elements. The profile editor module 220 is configured to retrieve the values and fields of the member profile from the local profile database 222 and receive changes thereto. Once the user 126 completes the edits to the values of the member profile, the profile editor 220 commits such changes to the local profile database 222. The profile editor 220 may then communicate the changes to the organizational directory server 112, which then incorporates such changes into the organizational directory database 122.

In an alternative embodiment, the local profile database 222 is implemented in a read-only mode, such that the user 126 is prevented or prohibited from changing one or more values of the user's member profile. In this embodiment, changes to the member profile are performed server-side (e.g., by an administrator or user of the organizational directory server 112), where the changes are then communicated by the organizational directory server 112 to the client device 104. In this alternative embodiment, the profile editor 220 may be omitted from the organizational directory access client.

The local search module 212 is configured to conduct a search of the local database 222 based on an input (e.g., one or more alphanumeric characters) provided by the user 126. In one embodiment, the local search module 212 implements a "search as you type" search model, whereby the local search module 212 performs one or more searches on the local profile database 222 as the user 126 types the search query via a provided user interface. In this model, if the user 126 desires to search for the term "Java," and begins typing starting with the letter "J", the local search module 212 performs one or more searches using the terms "J," "Ja," "Jav," and/or "Java" as the search queries as the user 126 enters each additional letter. The search results found by the local search module 212 are stored as the local search results 226. With this embodiment, the user interface module 212 displays the local search results 226 in real-time, or near real-time, to the user 126.

While the foregoing discussion of the local search module 212 focuses on a partial search query provided via a "search as you type" model, other types of partial searches may also be performed. For example, the local search module 212 may implement a "search as you speak" model that conducts one or more search queries while the user 126 is speaking his or her search query into the client device 104. In one embodiment, the user 126 signifies that the vocal search query is completed by speaking a preconfigured command word or phrases such as "end search," "perform search," "period," or by remaining silent for a preconfigured amount of time (e.g., three seconds).

The network search module 214 is configured to perform one or more searches via the network 124 in response to a provided search query. In one embodiment, the network search module 214 communicates a completed search query to the organizational directory server 112 and/or one or more social networking servers (e.g., the social networking server 118) and receive search results therefrom. In this embodiment, a completed search query is a search query that the user 126 provides via a user interface and indicates that the search query is complete. For example, the user 126 may type his or her search query and then select a displayed element (e.g., a displayed graphic marked "Search" or other similar graphical symbol) that instructs the network search module 214 to perform the search (e.g., communicate the search to one or more of the servers 112,118).

In this embodiment, and by way of example, suppose that the user 126 desires to search for member profiles that include the term "Java." In this example, the user 126 provides the term "Java" into a text box or other input element, and then selects a graphical element, such as a graphic button marked "Search," which instructs the network search module 214 to communicate the term "Java" to the organizational directory server 112 and/or one or more social networking servers (e.g., the social networking server 118). The network search module 214 then receives search results which, in this example, presumably include one or more member profiles that include the term "Java." The received member profiles are stored as the network search results 228 and are displayed on the client device 104 via one or more user interfaces provided by the user interface module 210. In one embodiment, the network search results 228 are displayed alongside, or on the same user interface, as the local search results 226. The user 126 may then select one or more of the local search results 226 and/or the network search results 228 for display on the client device 104.

While the foregoing discussion describes the operations of the local search module 212 and the network search module 214 separately, such operations may be performed in parallel or serial. Thus, network search module 214 is waiting for a command to perform the network search, the local search module 212 may be conducting searches of the local profile database 222 as the user is entering his or her search query. In this manner, a single input element, such as a text box, can be used to provide a search query to both the local search module 212 and the network search module 214.

Figure 3:
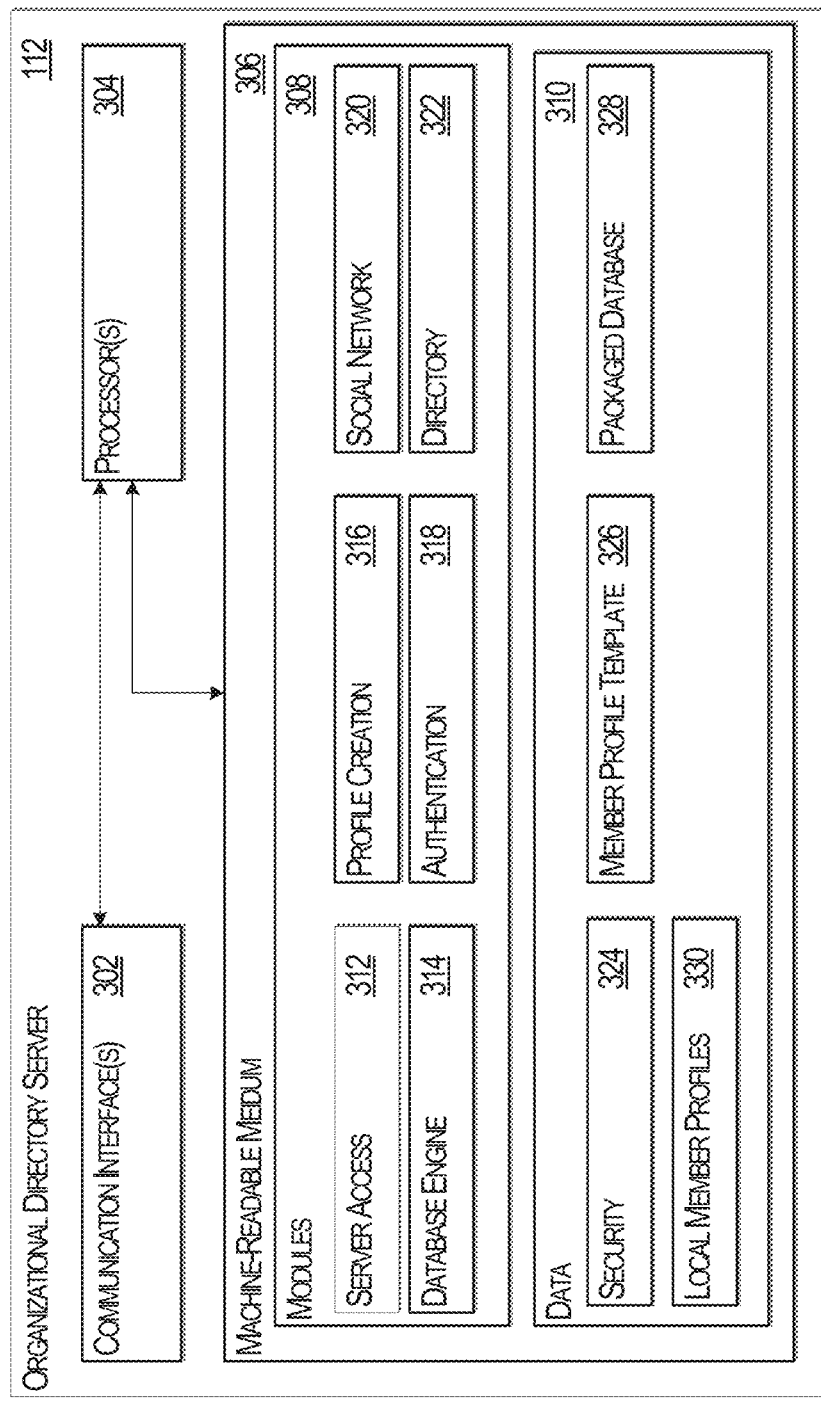
FIG. 3 illustrates the organizational directory server of FIG. 1 in accordance with an example embodiment.

FIG. 3 illustrates the organizational directory server of FIG. 1 in accordance with an example embodiment. In one embodiment, the organizational directory server 112 includes one or more processor(s) 304, one or more communication interface(s) 302, and a machine-readable medium 306 that stores computer-executable instructions for one or more modules(s) 308 and data 310 used to support one or more functionalities of the modules 308.

The various functional components of the organizational directory server 112 may reside on a single device or may be distributed across several computers in various arrangements. The various components of the organizational directory server 112 may, furthermore, access one or more databases (e.g., databases 120-122 or any of data 310), and each of the various components of the organizational directory server 112 may be in communication with one another. Further, while the components of FIG. 3 are discussed in the singular sense, it will be appreciated that in other embodiments multiple instances of the components may be employed.

The one or more processors 304 may be any type of commercially available processor, such as processors available from the Intel Corporation, Advanced Micro Devices, Texas Instruments, or other such processors. Further still, the one or more processors 304 may include one or more special-purpose processors, such as a Field-Programmable Gate Array (FPGA) or an Application Specific Integrated Circuit (ASIC). The one or more processors 304 may also include programmable logic or circuitry that is temporarily configured by software to perform certain operations. Thus, once configured by such software, the one or more processors 304 become specific machines (or specific components of a machine) uniquely tailored to perform the configured functions and are no longer general-purpose processors.

The one or more communication interfaces 302 are configured to facilitate communications between the organizational directory server 112, the client device 104, and one or more of the database server(s) 116 and/or database(s) 120-122. The one or more communication interfaces 302 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combination of such wired and wireless interfaces.

The machine-readable medium 306 includes various modules 308 and data 310 for implementing the organizational directory server 112. The machine-readable medium 306 includes one or more devices configured to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the modules 308 and the data 310. Accordingly, the machine-readable medium 306 may be implemented as a single storage apparatus or device, or, alternatively and/or additionally, as a "cloud-based" storage systems or storage networks that include multiple storage apparatus or devices. As shown in FIG. 3, the machine-readable medium 306 excludes signals per se.

In one embodiment, the modules 308 are written in a computer-programming and/or scripting language. Examples of such languages include, but are not limited to, C, C++, C#, Java, JavaScript, Perl, Python, or any other computer programming and/or scripting language now known or later developed.

With reference to FIG. 3, the modules 308 of the organizational directory server 112 include, but are not limited to, a server access module 312, a database engine module 314, a profile creation module 316, an authentication module 318, a social network access module 320, and a directory access module 322. The data 310 supporting these modules 308 include, but are not limited to, security data 324, a member profile template 326, a packaged database 328, and one or more local member profiles 330.

The server access module 312 is configured to provide access to the organizational directory server 112 by the client device 104 and one or more of the client devices 114. In one embodiment, the server access module 312 implements one or more SOA services, one or more ROA services, an API, or combinations thereof, that allow the client device 104 and one or more of the client devices 114 to obtain information from, and provide information to, the organizational directory server 112. The service access module 312 provides access to one or more of the other modules of the organizational directory server 112 including, but not limited to, the database engine 314, the profile creation module 316, the authentication module 318, the social network module 320, and the directory module 322. One of ordinary skill in the art will recognize that the server access module 312 may provide access to additional or alternative sets of modules 308 implemented by the organizational directory server 112.

The database engine 314 is configured to create a customized database of organizational member profiles for deployment to the client device 104 and/or the client devices 114. In one embodiment, the database engine 314 is implemented as a relational database management system, such as SQLite, MySQL, or PostgreSQL, which creates the customized database as the packaged database 328. Where the database engine 314 is implemented as SQLite, the packaged database 328 is stored in a format accessible by SQLite, such as ".sqlite." In alternative embodiments, the database engine 314 is implemented as a hierarchical database, an object-oriented database, a flat file database, or combinations thereof.

In one embodiment, the packaged database 328 includes one or more member profiles for members of the organization (e.g., associated with the organization). Accordingly, the member profiles for the packaged database 328 may be obtainable and/or created from different sources of member profile information. In one embodiment, the member profiles for the packaged database 328 are obtainable from an organizational directory 122 communicatively coupled to the organizational directory server 112. Alternatively or additionally, the member profiles may be obtained from a database 120 of social networking profiles accessible via a social networking server 118 (e.g, the social networking server 118 provides access to the database 120 via a SOA service, ROA service, API, or combinations thereof). Member profiles (or a portion thereof) obtained from the organizational directory 122 and/or the social networking profiles 120 are stored as local member profiles 330, which are then packaged by the database engine 314 as the packaged database 328.

The database engine 314 may be configured to include a complete member profile in the packaged database 328 or a portion thereof (e.g., a subset of the information stored by the organizational directory database 122). For example, the organizational directory database 122 may have 20-30 different attributes (e.g., fields) for a given member, and the database engine 314 selects a specific set of those attributes to include in a member profile for the packaged database 328 (e.g., member name, organization e-mail address, organization phone number, etc.). A member profile having this select number of attributes may be stored as the local member profiles 330 (e.g., a member profile in the local member profiles 330 is a subset of a member profile stored in the organizational directory database 122). In one embodiment, the data 310 includes a member profile template 326, which specifies which of the attributes (e.g., fields) the database engine 314 is to select (e.g., copy from and/or create) in creating the local member profiles 330.

In alternative embodiments, the database engine 314 creates the packaged database 328 using all of the attributes (e.g., fields) of a member profile from the organizational directory database 122. In effect, the database engine 314 copies member profiles from the organizational directory database 122 to the local member profiles 330, which it then uses to create the packaged database 328.

With reference to FIG. 1, and in one embodiment, the database engine 314 is selective in choosing which member profiles to include in the local member profiles 330. For example, the database engine 314 may select the one or more member profiles according to whether a corresponding member has registered with the organizational directory server 112 (e.g., via the security module 218). In this embodiment, only those members that have registered with the organizational directory server 112 are included in the local profile database 222. In an alternative embodiment, the database engine 314 selects member profiles according to an attribute or field of the member profile corresponding to the user 126 using the client device 104. For example, a member profile may have a department field, and member profiles having the same department value (e.g., Quality Assurance, Development, Product Support, etc.) are included in the packaged database 328. As another example, a member profile may have a region field, and member profiles having the same region (e.g., California, United States, Western Hemisphere, Third District, etc.) are included in the packaged database 328. In yet a further embodiment, the member profiles included in the packaged database 328 are all of the member profiles stored in the organizational directory database 122. The foregoing examples are meant to be illustrative, not exhaustive, and one of ordinary skill in the art will recognize that variations and alternatives of the packaged database 328 are possible and contemplated as falling within the scope of this disclosure.

In yet another embodiment, the database engine 314 is configured to selectively modify the packaged database 328 during transmission to the client device 104. In this regard, as the packaged database 328 is being transmitted to the client device 104, the database engine 314 scans portions of the packaged database 328. Portions of the packaged database 328 include one or more bytes of the packaged database 328 in its native file format, one or more bytes of the payload of a TCP/IP packet that includes portions of the packaged database 328, and other such arrangements of the packaged database 328.

When the database engine 314 scans the portion of the packaged database 328, the database engine 214 determines whether the portion being scanned corresponds to a preference previously indicated by the user of the client device 104. For example, the user may have indicated that particular members of the organization are not to be included in the packaged database 328. When such portion is identified (e.g., by doing a comparison between the value of the portion and the user preference), the database engine 314 modifies the member entry corresponding to the portion being scanned. In one embodiment, the database engine 314 modifies the entry by writing NULL values to various fields of the member entry. Thus, when the client device 104 receives the packaged database 328, the member entry having the NULL values is viewed as a blank entry. In other embodiments, the database engine 314 skips one or more bytes of the packaged database 328 such that the skipped bites are not transmitted to the client device 104. In this manner, the database engine 314 ensures that the client device 104 receives a packaged database 328 conforming to the preferences indicated by the user.

In alternative embodiments, the database engine 314 modifies the portion of the packaged database 328 in response to one or more satisfied conditions. For example, a member of the organization may have indicated that he or she does not desire that his or her profile be included in the packaged database 328. Accordingly, in this example, the database engine 314 modifies the packaged database 328 immediately prior to its transmission to omit this member (e.g., by writing NULL values to the fields of the member's profile or by skipping the bytes corresponding to the member's profile). In another example, one or more of the modules 308 may have determined that a given member profile is not to be included in the packaged database 328. For example, the database engine 314 may have determined that a given member profile corresponds to a member that is no longer a member of the organization (e.g., the member may have recently left the organization). In this example, the database engine 314 omits the member profile from the packaged database 328. Thus, the packaged database 328 may be modified prior to its transmission to the client device 104 based on various satisfied conditions.

The profile creation module 316 is configured to create a member profile according to the member profile template 326. As discussed above, the database engine 314 is configured to retrieve one or more member profiles (e.g., member profile information) from the organizational directory database 122 and/or social networking profiles 120. In one embodiment, the database engine 314 invokes the profile creation module 316 to create one or more local member profiles 330 according to the attributes (e.g., fields) identified by the member profile template 326. In other words, and as discussed previously, a member profile of the local member profiles 330 contains a subset of the member profile information from a member profile of the organizational directory 122 and/or the social networking profiles 120. In an alternative embodiment, the member profile information is copied from the organizational directory database 122 and/or the social networking profiles 120.

The authentication module 318 is configured to authenticate a user 126 of the client device 104 and/or the users of the client devices 114. In this context, the purpose of authenticating the user is to confirm that he or she is, in fact, a member of the organization or otherwise affiliated. The authentication module 318 may leverage the security data 324, which, as discussed below, contains different sets of information for authenticating the user 126.

In one embodiment, the authentication module 318 leverages a two-factor authentication model to authenticate a user. In this embodiment, the authentication module 318 first confirms that the user 126 is a member of a social networking service that has partnered with the organization to deploy the organizational directory access server 112 and the organizational directory access client (e.g., being executed on the client device 104). For example, the client device may prompt the user 126 to provide a previously registered identifier, such as a username or e-mail address, along with a password, to the social networking server 118. In some embodiments, the authentication module 318 may act as an intermediary, receiving the username/e-mail address/password for the user, and communicating the same to the social networking server 118. In this embodiment, should the social networking server 118 confirm that the user 126 has previously registered with it (e.g., has a member profile within the social networking profiles 120), the authentication module 318 is informed that the user is registered with the social networking server 118. In an alternative embodiment, the client device 104 communicates the username/e-mail address/password to the social networking server 118 and, upon successfully authenticating the user 126, receives an access token authorizing the user 126 to access the organizational directory access client and/or organizational directory server 112. As one of ordinary skill in the art will recognize, should the user not provide a username, e-mail address, and/or password previously registered with the social networking server 118, the user 126 will not have access to the organizational directory access client.

In the second step of the two-factor authentication, the client device 104 may prompt the user to provide an identifier (e.g., username, e-mail address, phone number, etc.), previously registered with the organizational directory server 112, which may be stored as an attribute value for one or more of the member profiles of the organizational directory 122. Upon receiving the identifier, and in one embodiment, the authentication module 318 first confirms that the identifier is one that is registered with the organizational directory server 112 (e.g., is stored as an attribute value for a member profile corresponding to the user 126).

Once confirmed, the organizational directory server 112 generates a code to be sent to the identifier provided by the user 126. For example, the authentication module 318 may generate a 4-digit number based upon the security data 324, which may include a seed for a pseudorandom number generator. As another example, the authentication module 318 may generate a series of alphanumeric characters to be sent to the identifier provided by the user 126. Should the authentication module 318 receive the code sent to the user 126 (e.g., the user 126 provides the authentication module 318 with the code via the client device 104), the authentication module 318 then authenticates the user 126 with the organizational directory server 112. In one embodiment, authenticating the user 126 includes updating an attribute or field within one or more of the member profiles of the organizational directory 122 indicating that the user 126 has been authenticated. In this manner, the two-factor authentication serves to validate that the user 126 has a member profile with the social networking profiles 120 and is a member of the organizational directory 122.

The organizational directory server 112 also includes modules for communicating with the social networking server 118 (or the social networking profiles 120), one or more database server(s) 116, and the organizational directory 122. In particular, and in one embodiment, the organizational directory server 112 includes a social network module 320 and a directory module 322. The social network module 320 is configured to receive information from, and provide information to, one or more social networking servers, such as the social networking server 118. Similarly, the directory module 322 is configured to receive information from, and provide information to, one or more of the database server(s) 116 and/or the organizational directory 122. In this manner, when information is requested from, or provided to, the database server(s) 116, the social networking server 118, and/or the organizational directory 122, the social network module 320 and the directory module 322 are invoked to perform such operations.

Figure 4:
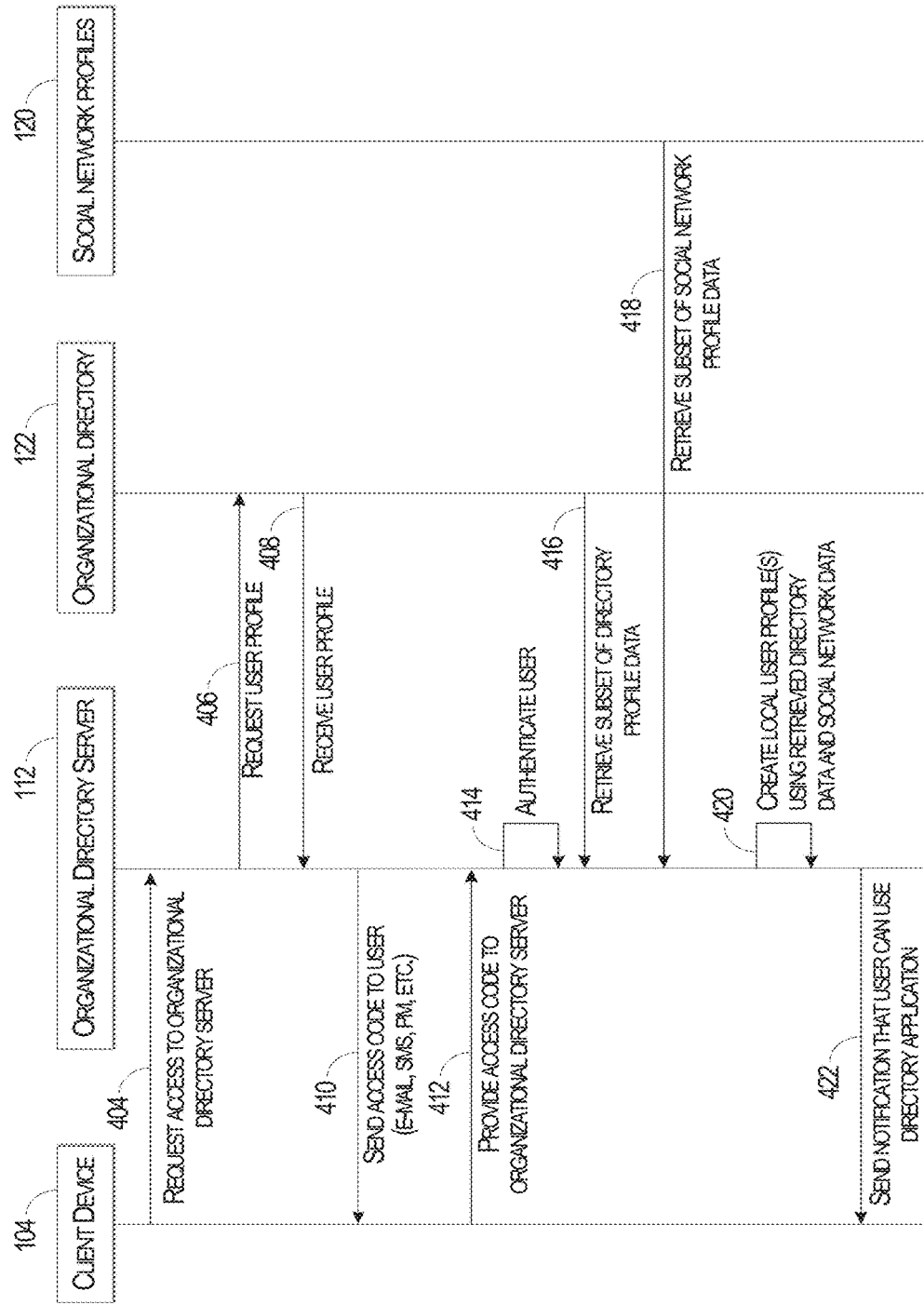
FIG. 4 illustrates a message passing diagram showing messages communicated between the various devices and systems of FIG. 1 in accordance with an example embodiment.

FIG. 4 illustrates a message passing diagram 402 showing messages 404-422 communicated between the various devices and systems of FIG. 1 in accordance with an example embodiment. Initially, the client device 104 communicates a message 404 requesting access to the organizational directory server 122 (Message 404). In this regard, the client device 104 communicates an identifier to the organizational directory server 112 that identifies the user, such as an e-mail address, username, or other identifier, along with a password or other authentication identifier.

In the embodiment shown in FIG. 4, the organizational directory server 112 communicates with the organization directory 122 to confirm the user identity. For example, the organizational directory server 112 may request a user profile from the organizational directory 122 (Message 406) and receive a copy of it (Message 408). In an alternative embodiment, the organizational directory server 112 queries the organizational directory 122 to determine whether the provided identifier is listed as an authorized member of the organization. Should the organizational directory server 112 be unable to confirm that the user is a member of the organization, the organizational directory server 122 may communicate such message to the client device 104.

However, where the organizational directory server 122 verifies that the user a member of the organization (e.g., the provided identifier is listed in the organizational directory 122), the organizational directory server 122 sends an access code to the provided identifier (Message 410). As discussed previously with regard to FIG. 3, the access code may be generated by the authentication module 318 in the form of one or more alphanumeric characters. In one embodiment, the access code is a 4-digit PIN. The access code is then communicated to the user, such as by sending the access code to an e-mail address, phone number via SMS, direct message using a instant messaging application, or other such means. Regardless of the destination of the access code, the organizational directory server 112 may inform the client device 104 that the access code was sent.

After the user 126 receives the access code, the user 126 then provides the access code to the organizational directory server 112 via the client device 104 (Message 412). The organizational directory server 112 then authenticates that the user 126 sent the correct access code, such as by comparing a stored version of the access code sent to the user 126 with the access code received from the user 126 (Operation 414). Where the user is authenticated the organizational directory server 122 the retrieves member profile information from the organizational directory 122 to include in the local member profiles 330, which, as discussed above, will be incorporated by the client device 104 as the local profile database 222 (Operation 416). As explained with regard to the profile creation module 316 and the database engine 314, the local member profiles 330 may be a subset of the member profiles stored in the organizational directory 122.

Additionally or alternatively, the organizational directory server 112 retrieves member profile information from the social network profiles 120 (Operation 418). In this regard, the retrieved member profile information may be selected according to the fields and/or attributes identified by the member profile template 326 (Message 418). Thereafter, the organizational directory server 112 creates the various local member profiles, which are packaged by the database engine 314 into the packaged database 328 (Operation 420). The organizational directory server 112 then sends a notification to the client device 104 that the user 126 is permitted to use the organizational directory access client.

FIGS. 5-15 illustrate various graphical user interfaces 502-1502, in accordance with example embodiments, displayable on the client device 104 of FIG. 1. FIGS. 5-15 are discussed with reference to FIGS. 16A-16F, which illustrate a method 1602, according to an example embodiment, for conducting a local and network search of member profiles using the client device 104 of FIG. 1.

Figure 5:
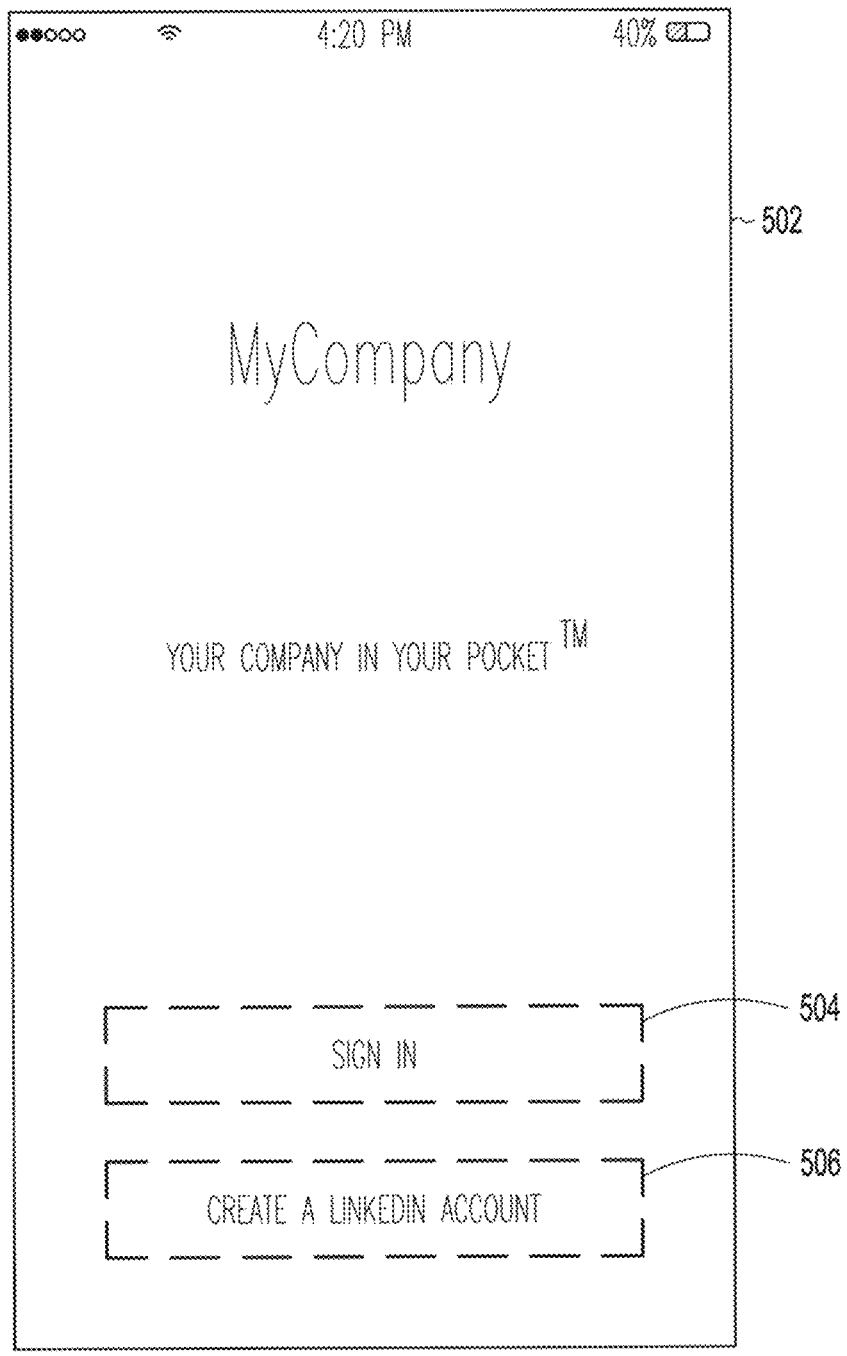
FIGS. 5-15 illustrate various graphical user interfaces, in accordance with example embodiments, displayable on the client device for interacting with the organizational directory server of FIG. 1.
Figure 16A:
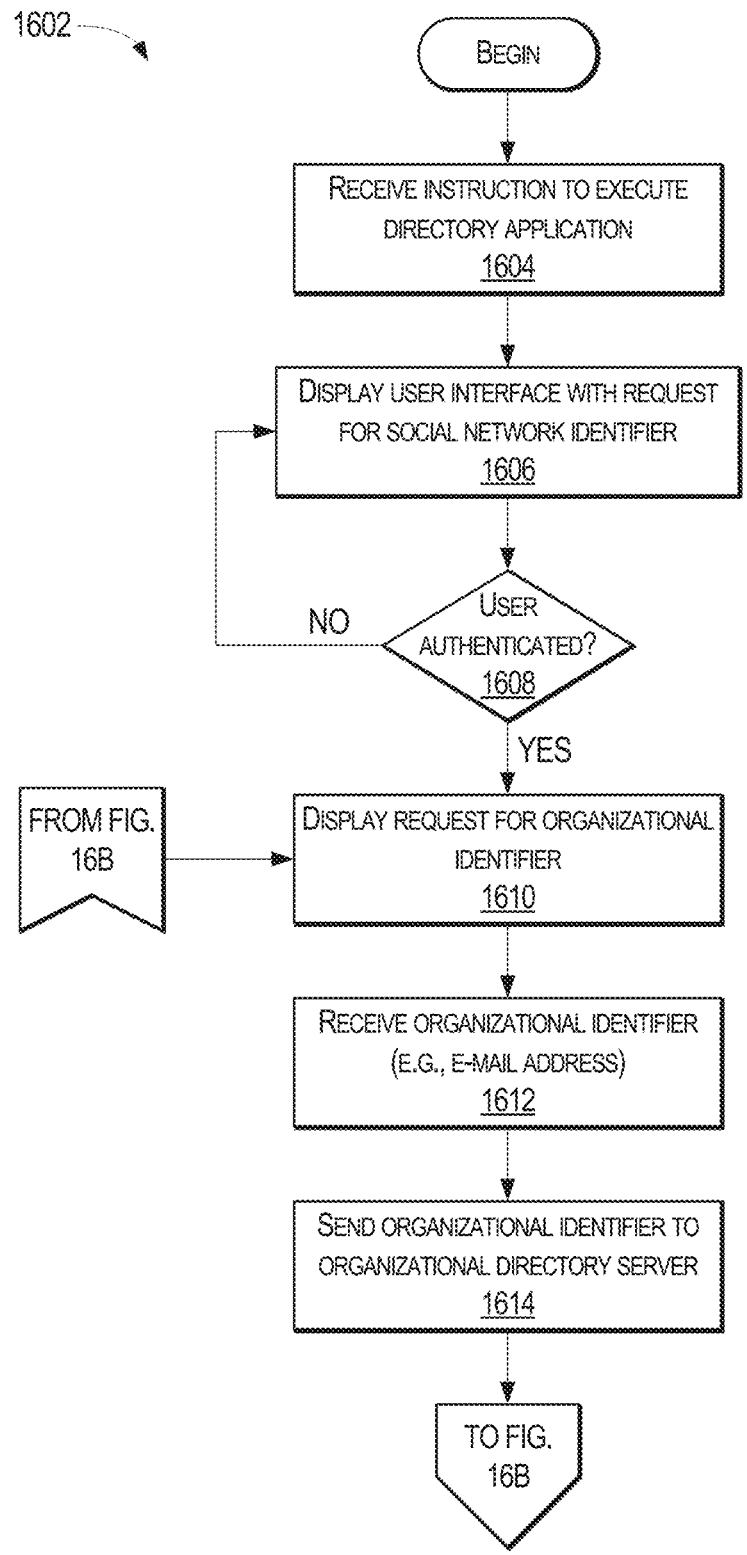
FIGS. 16A-16F illustrate a method, according to an example embodiment, for conducting a local and network search of member profiles using the client device of FIG. 1.

Referring first to FIG. 16A, the client device 104 receives an instruction to instantiate the organizational directory access client (Operation 1604). FIG. 5 illustrates a graphical user interface 502 that is displayed by the organizational directory access client, according to an example embodiment, when the organizational directory access client is instantiated. As shown in FIG. 5, the graphical user interface 502 includes various selectable elements 504-506. When the login element 504 is selected, the client device 104 prompts the user 126 to provide a social network identifier (Operation 1606). Should the user 126 not have a social networking profile, the user 126 can select element 506, which then causes the client device 104 to display various user interfaces for registering a member profile with a social networking service.

Figure 6:
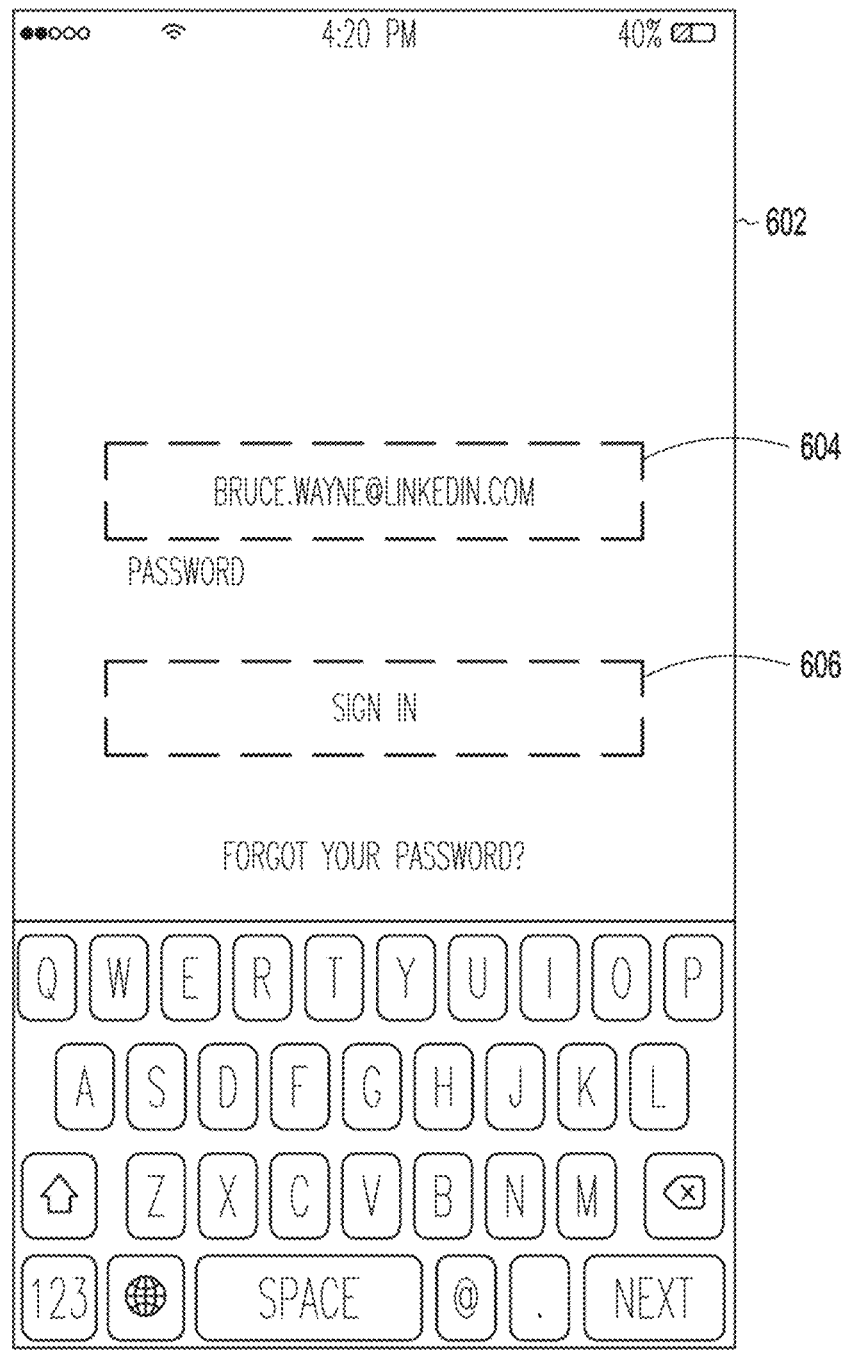

FIG. 6 illustrates a graphical user interface 602, according to an example embodiment, that displays an input element 604 and a selectable element 606 in response to the user 126 selecting selectable element 504. The user 126 then provides a social networking identifier in the input element 604. One example of a social networking identifier is the user's e-mail address that he or she used to register with the social networking service. The client device 104 may further request that the user provide a password or other security measure (e.g., a fingerprint) to confirm the user's identity.

The user 126 then selects selectable element 606, which causes the client device 104 to request authentication of the user 126 (Operation 1608). In particular, and in one embodiment, the client device 104 communicates the social networking identifier and/or the security measure entered in the input element 604. For example, the client device 104 may communicate the social networking identifier and/or the security measure to the organizational directory server 122, one or more social networking services, or combinations thereof. Should the organizational directory server 122 and/or the one or more social networking services social networking server 118 not be able to authenticate the user 126 (e.g., the provided social networking identifier and security measure were not previously registered), then the client device 104 may re-prompt the user to provide a social networking identifier and security measure ("No" branch of Operation 1608).

Figure 7:
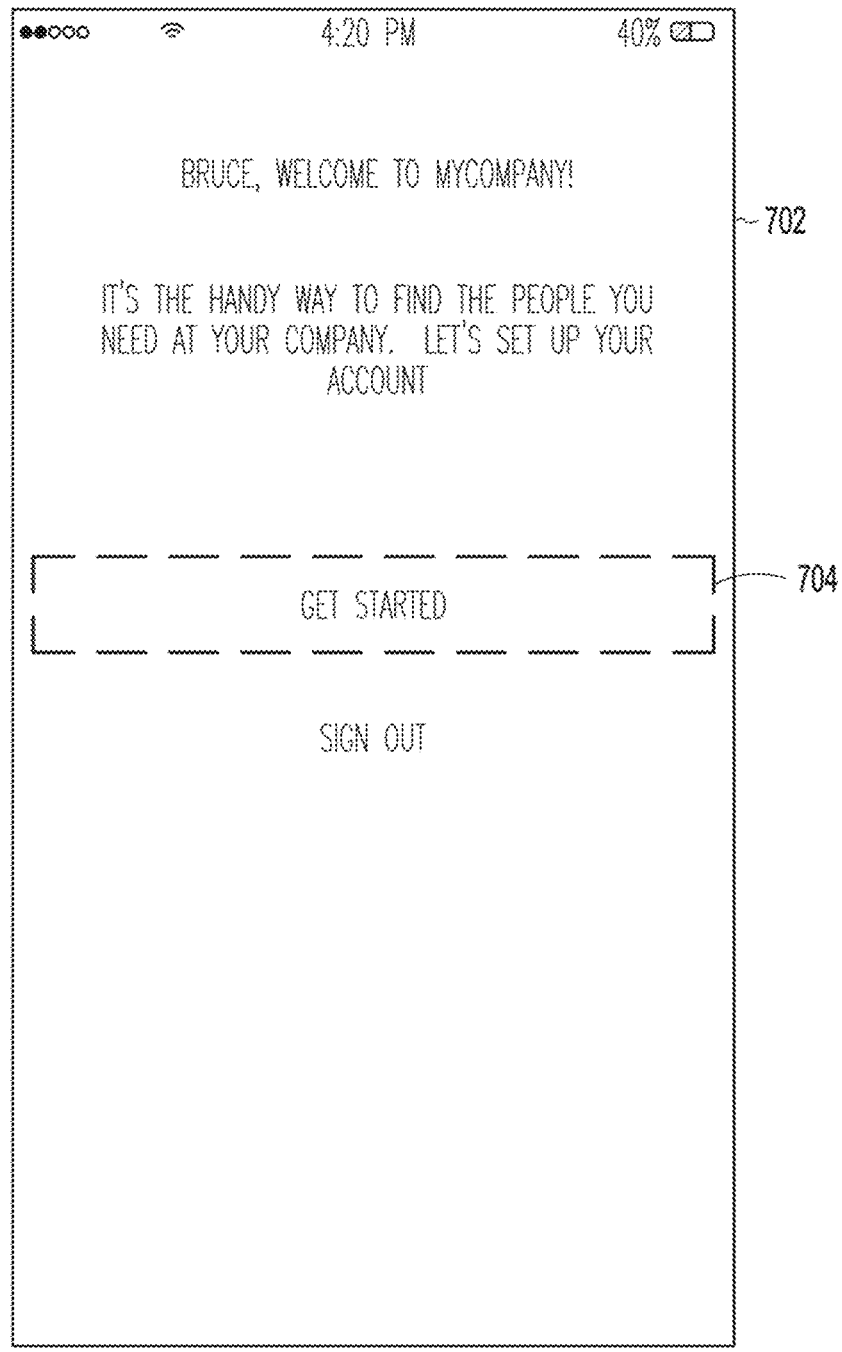
Figure 8:
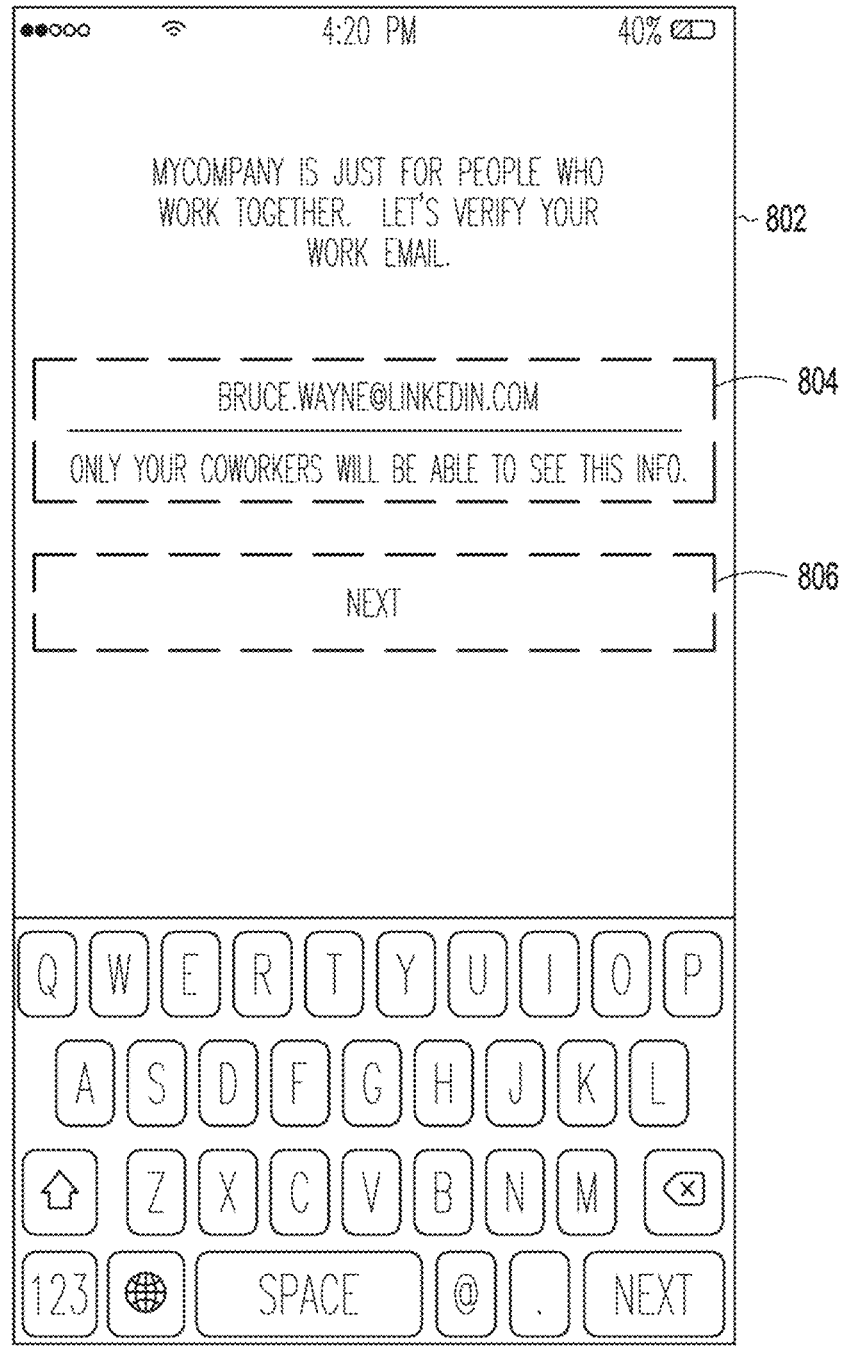

Alternatively, where the user is authenticated ("Yes" branch of Operation 1608), the client device 104 then displays a prompt for the user to provide his or her organizational identifier (e.g., e-mail address, phone number, etc.) (Operation 1610). FIGS. 7-8 illustrate graphical user interfaces 702-802, according to some embodiments, that are displayed by the client device 104 in response to a successful authentication of the user 126 with the social networking identifier. As shown in FIG. 7, the graphical user interface 702 displays a selectable element 704 that the user 126 can select to continue the authentication process with respect to the organizational directory server 122. In FIG. 8, the graphical user interface 802 includes an input element 804 and a selectable element 806. With the input element 804, the user 126 can provide the organizational identifier (e.g., "brucewayne@linkedin.com") to authenticate that the user 126 is a member of the organization (Operation 1612). Upon selection of the selectable element 806, the organizational identifier provided in the input element 804 is communicated to the organizational directory server 112 (Operation 1614).

Figure 16B:
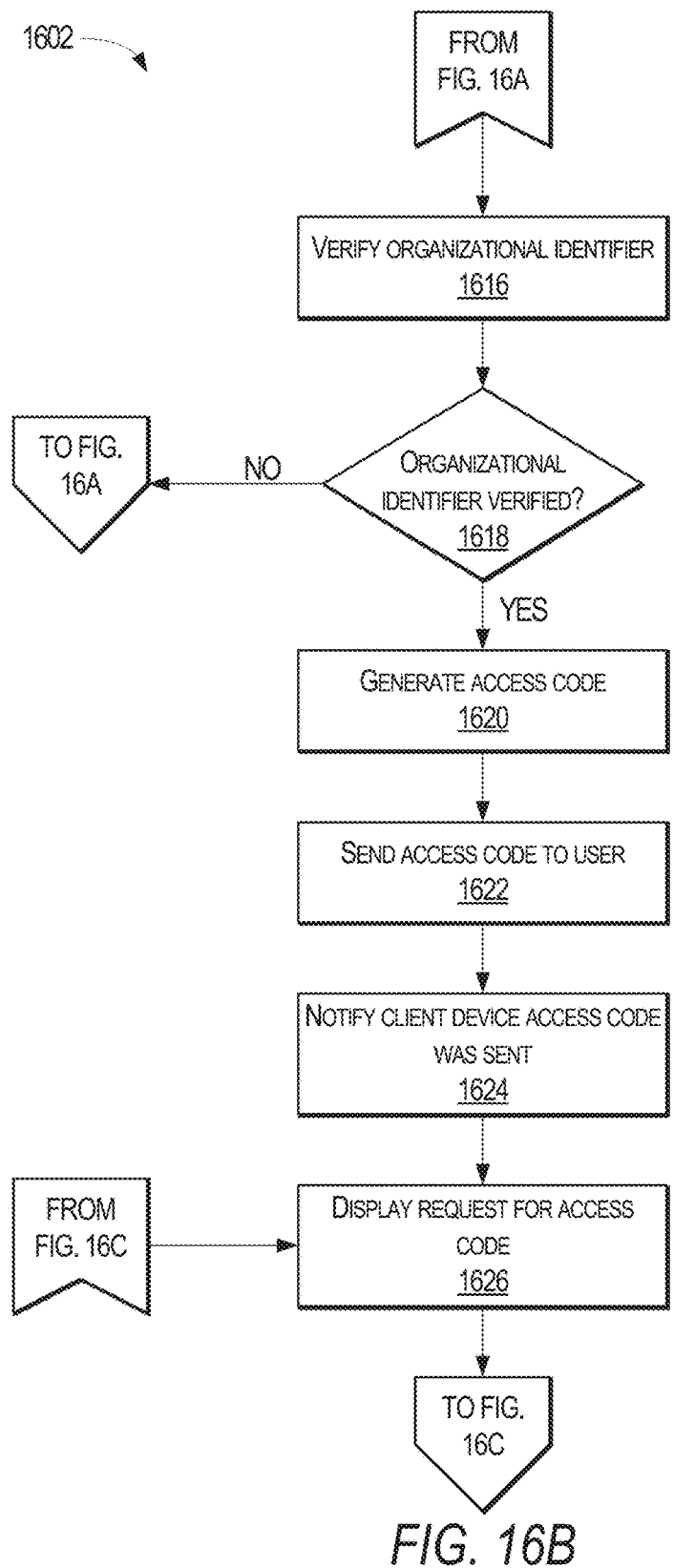

Continuing to FIG. 16B, the organizational directory server 112 then verifies the organizational identifier provided by the user 126 (Operation 1616). In one embodiment, and as discussed above, verifying the organizational identifier includes comparing the received organizational identifier with an attribute value stored in a member profile corresponding to the user 126. The organizational directory server 112 then determines whether the comparison was successful (Operation 1618). Where the comparison is not successful ("No" branch of Operation 1618), the method 1602 returns to Operation 1610 to inform the user 126 (via a prompt and/or a user interface displayed on the client device 104) that the provided organizational identifier is not acceptable. Where the comparison is successful ("Yes" branch of Operation 1618), the organizational directory server 112 then informs the client device 104 and generates an access code for the user (Operation 1620). The access code is then sent to the user 126 at the provided identifier (Operation 1622) and the client device 104 is informed accordingly (Operation 1624).

Figure 9:
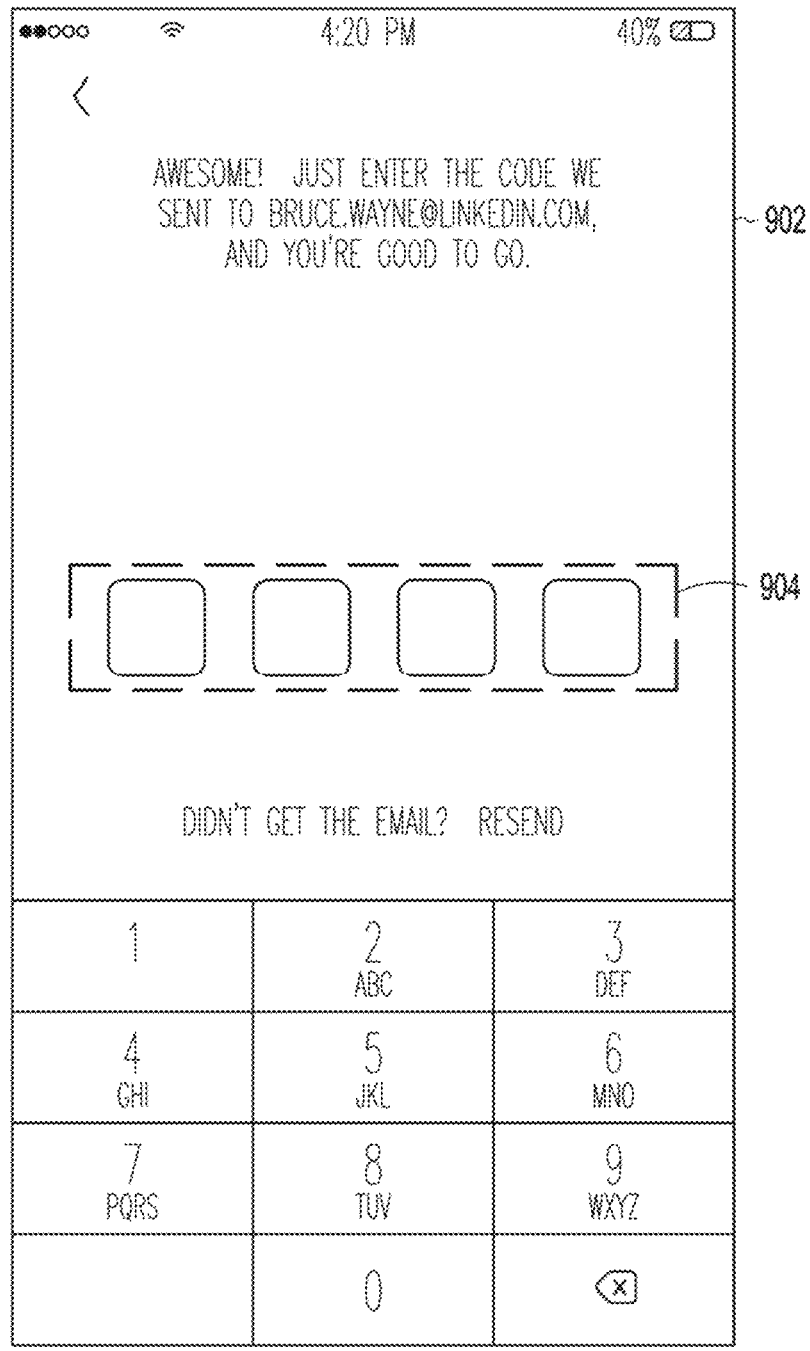

In response to a notification that the access code was sent to the user, the client device 104 displays a prompt for the provided access code (Operation 1626). In an alternative embodiment, the client device 104 is not notified that the access code was sent, but simply proceeds to the prompt for the provided access code after the user has provided his or her organizational identifier. Referring to FIG. 9 is a graphical user interface 902, in accordance with an example embodiment, for receiving the access code from the user 126. As shown in FIG. 9, the graphical user interface 902 includes an input element 904, which, in one embodiment, is configured to receive the access code in the form of a 4-digit PIN. In alternative embodiments, the input element 904 is configurable to be of any length to accommodate any number of alphanumeric characters generated by the organizational directory server 112 for the access code provided to the user 126.

Figure 16C:
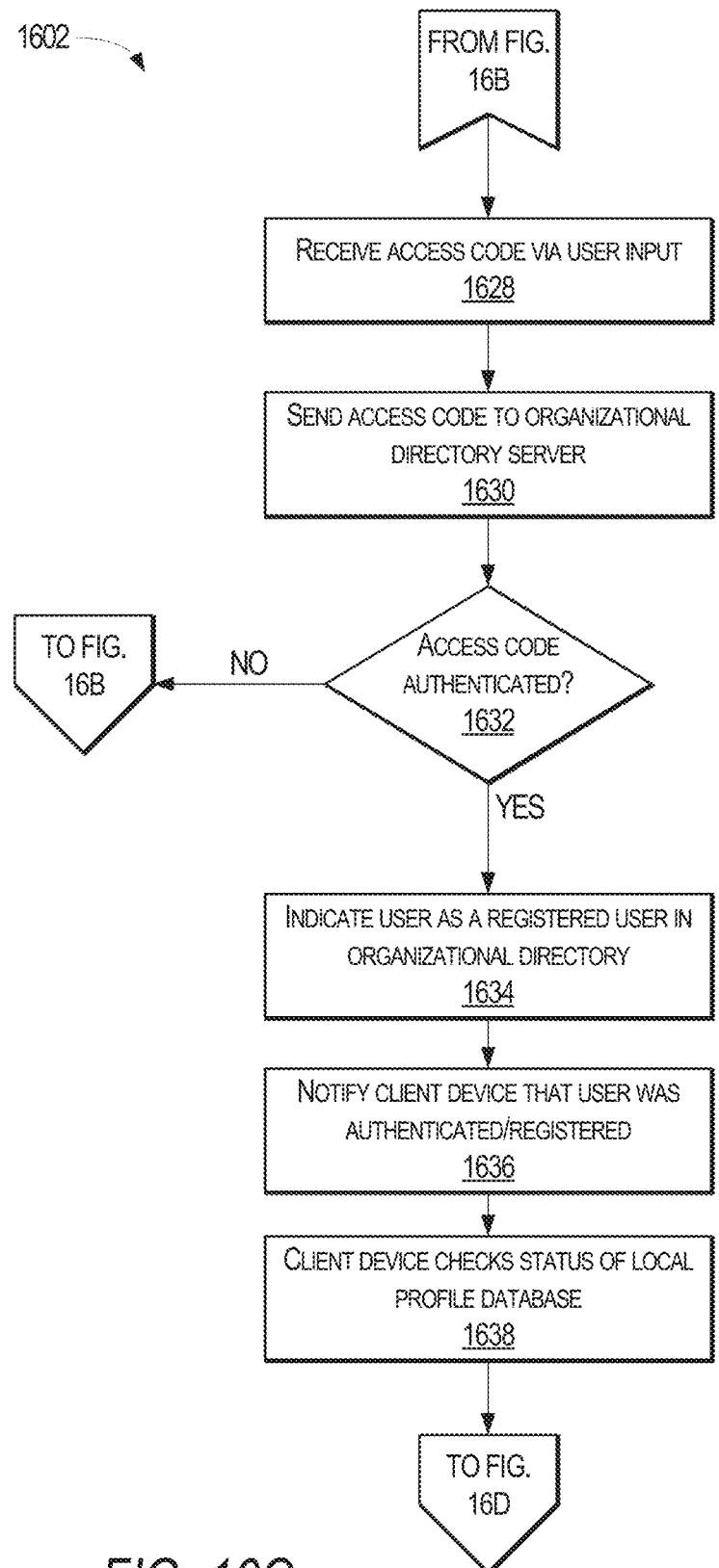

Referring now to FIG. 16C, the client device 104 receives an input from the user 126 via the input element 904 (Operation 1628). In one embodiment, the user 126 indicates that the access code has been entered, which, in turn, causes the client device 104 to communicate the provided access code to the organizational directory server 112 (Operation 1630). The organizational directory server 112 then authenticates the received access code (Operation 1632).

In one embodiment, authenticating the received access code includes comparing the provided access code from the user 126 with a copy of the access code sent to the organizational identifier provided by the user 126. Where the organizational directory server 112 determines that the access codes are not identical (e.g., "No" branch of Operation 1632), the organizational directory server 112 informs the client device 104 of the authentication failure, which then prompts the user 126 to re-enter the access code (Operation 1626). Alternatively, where the organizational directory server 112 determines that the access codes are identical (e.g., "Yes" branch of Operation 1632), the organizational directory server 112 updates a member profile associated with the user 126 to indicate that the user 126 has registered with the organizational directory server 112 as a user of the organizational directory access client (Operation 1634).

Figure 16D:
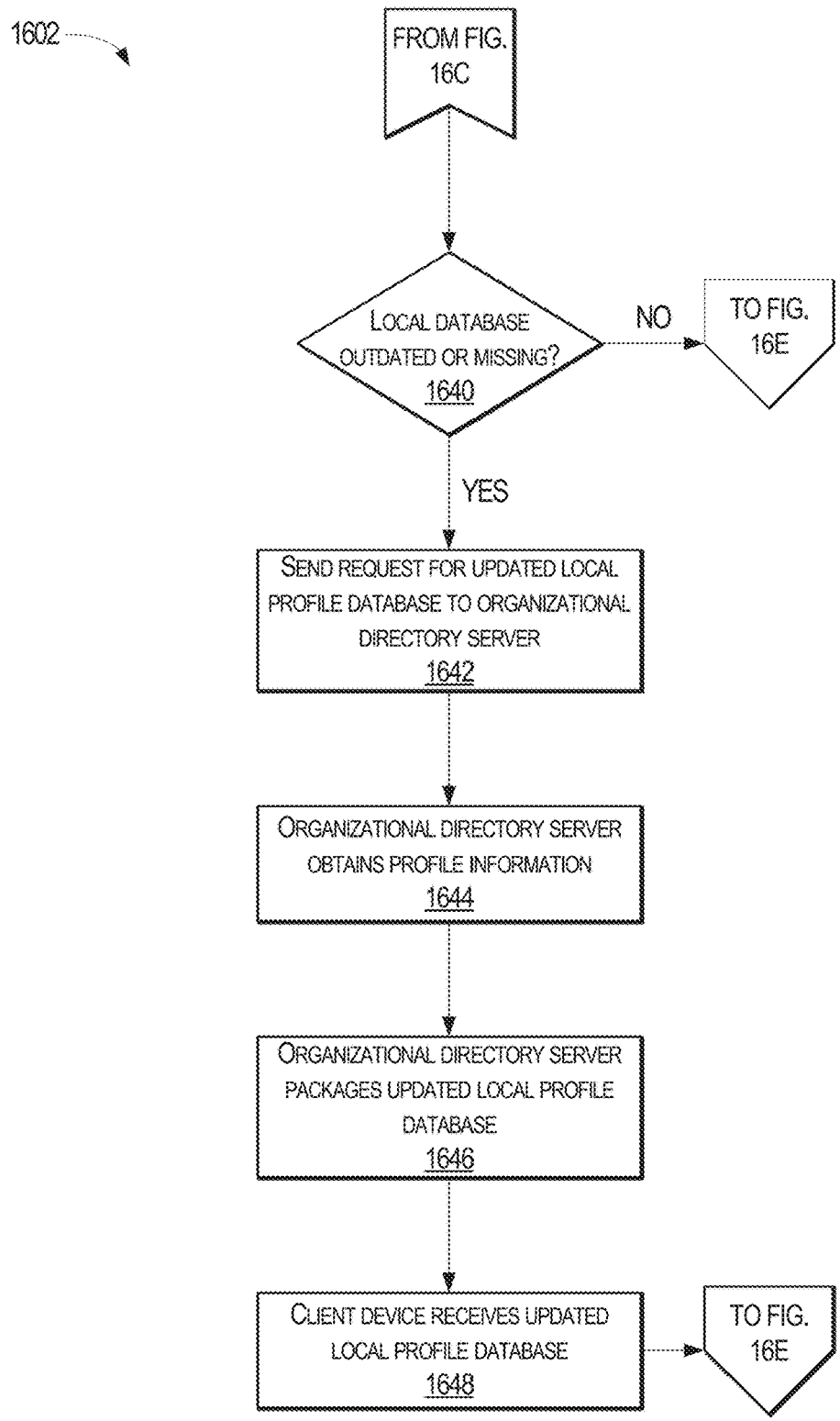

The organizational directory server 112 then informs the client device 104 that the user 126 is authenticated and/or registered with the organizational directory server 112 (Operation 1636). From there, the client device 104 checks the status of the local profile database 222 (Operation 1638). Referring to FIG. 16D, the client device 104 determines whether the local profile database 222 is outdated or missing (Operation 1640). In this regard, and as discussed previously, the client device 104 may determine whether a predetermined time period has elapsed since the local profile database 222 was last updated or whether a local profile database 222 exists. Where the local profile database 222 is outdated and/or missing (e.g., "Yes" branch of Operation 1640), the client device sends a request for an updated local profile database 222 to the organizational directory server 112 (Operation 1642). In response, the organizational directory server 112 prepares a packaged database 328 as discussed previously, such as by copying profile information from the organizational directory 122 and/or the social networking profiles 120 according to the member profile template 326 (Operations 1644-1646).

As also explained previously, the organizational directory server 112 may modify the packaged database 328 as it is being transmitted to the client device 104. In this regard, as also discussed, the organizational directory server 112 may inspect one or more bytes of the packaged database 328 about to be transmitted and determined whether the contents of the inspected one or more bytes correspond to a user preference, such as a member that the user does not want in the packaged database 328. When such contents are identified, the organizational directory server 112 may modify the packaged database 328 by skipping one or more bytes corresponding to the entry of the member in the packaged database 328 or by writing NULL values to fields of the member entry in the packaged database 328. As also mentioned previously, the organizational directory server 112 may modify the packaged database 328 in response to a determination that one or more conditions have been satisfied. The client device 104 then receives the packaged database 328 for importation as the local profile database 222 (Operation 1648).

Figure 16E:
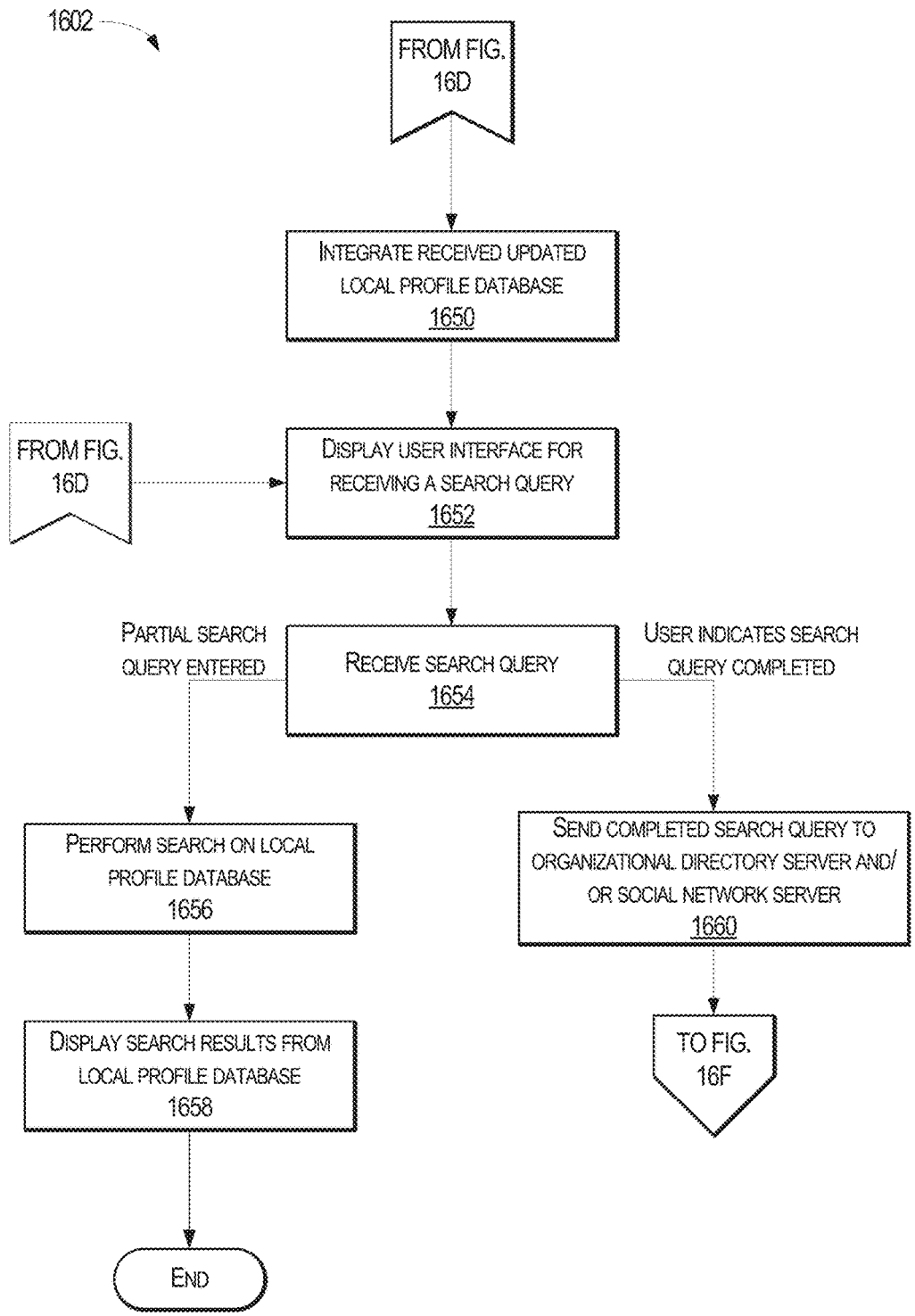

Referring to FIG. 16E, when the client device 104 receives the packaged database 328, it is imported as the local profile database 222 (Operation 1650). As discussed previously, the packaged database 328 may include one or more updated member profiles, a completely new local profile database 222, updated attribute values of particular member profiles, removed and/or added member profiles, or combinations of the foregoing.

Figure 10:
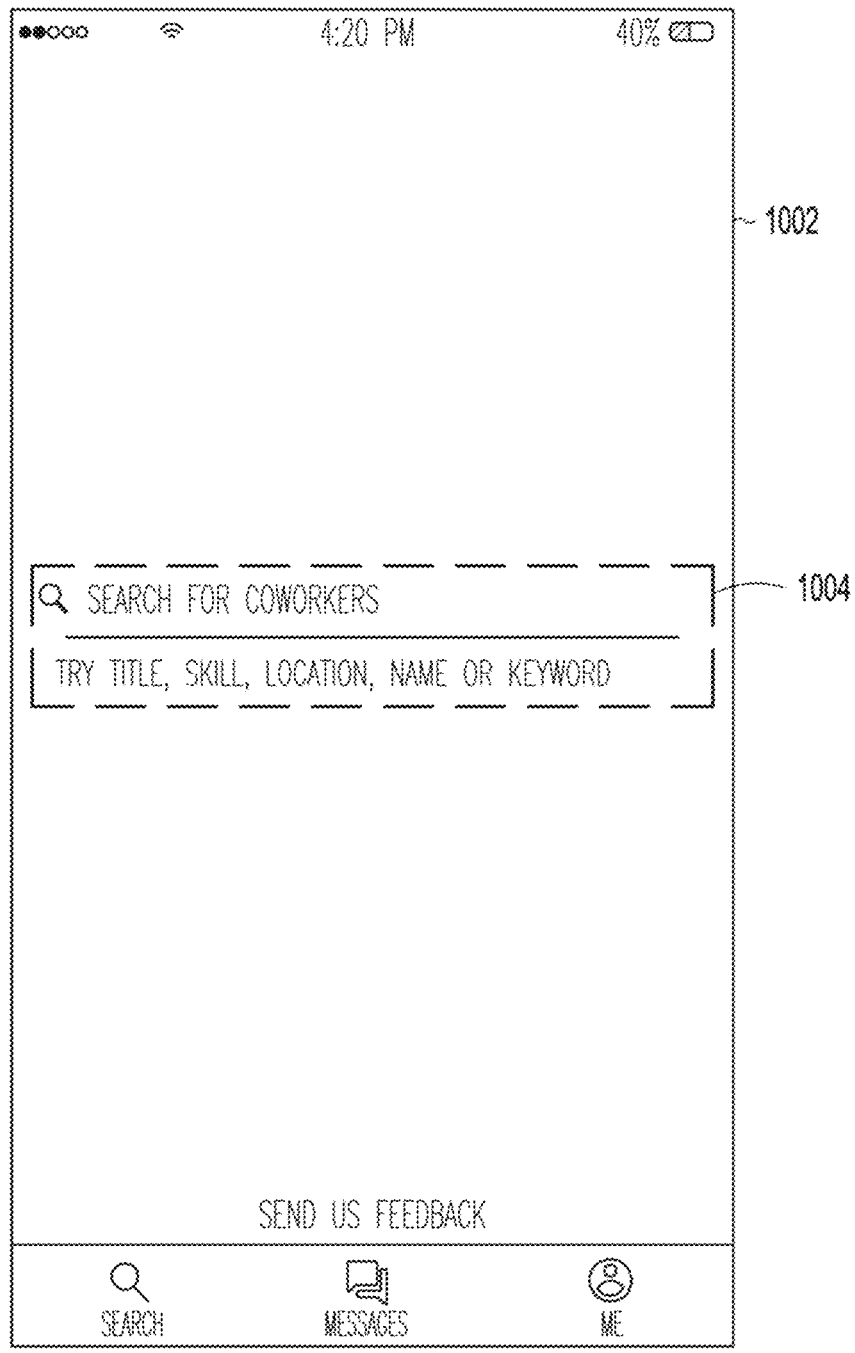
Figure 11:
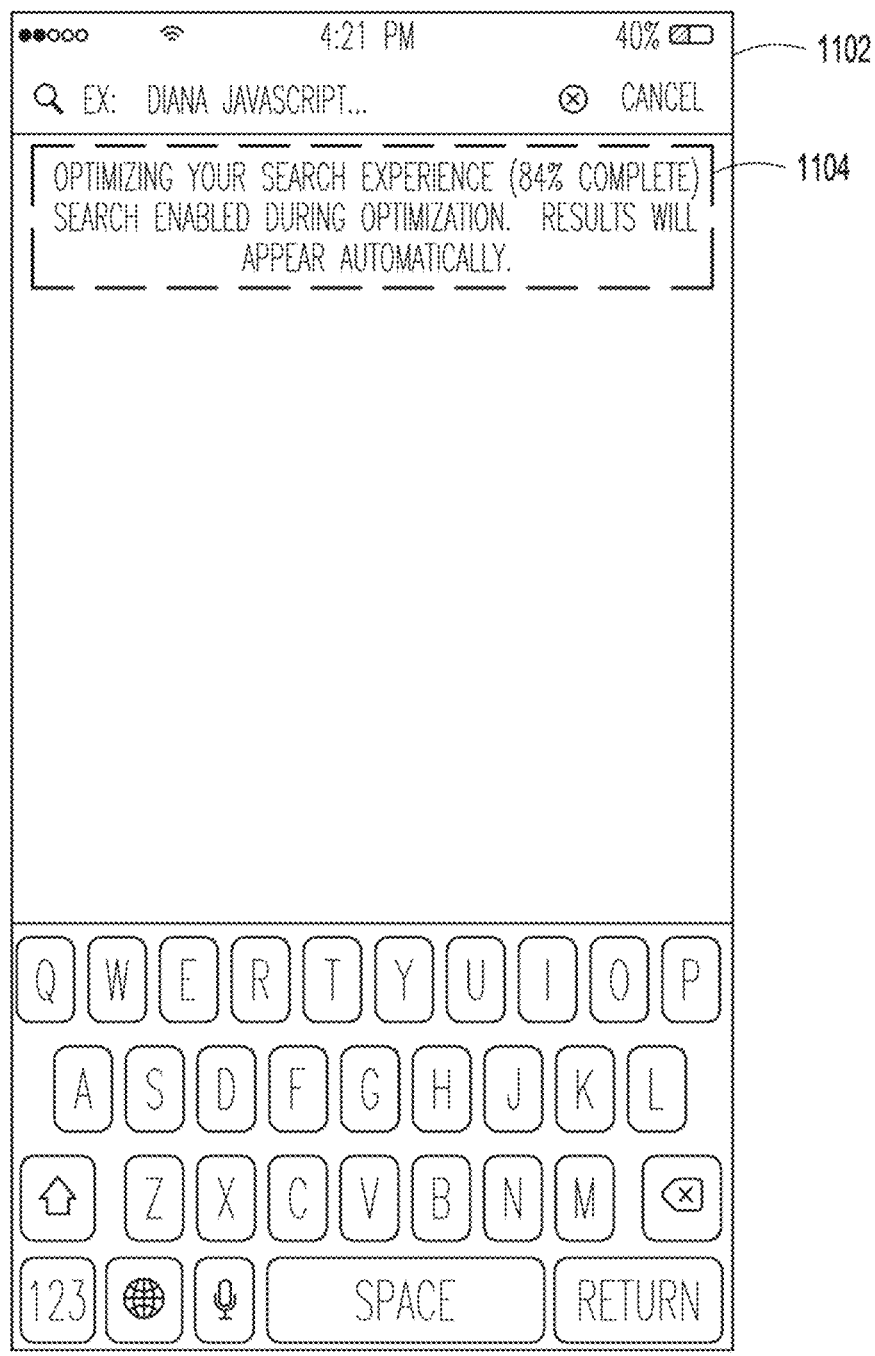
Figure 12:
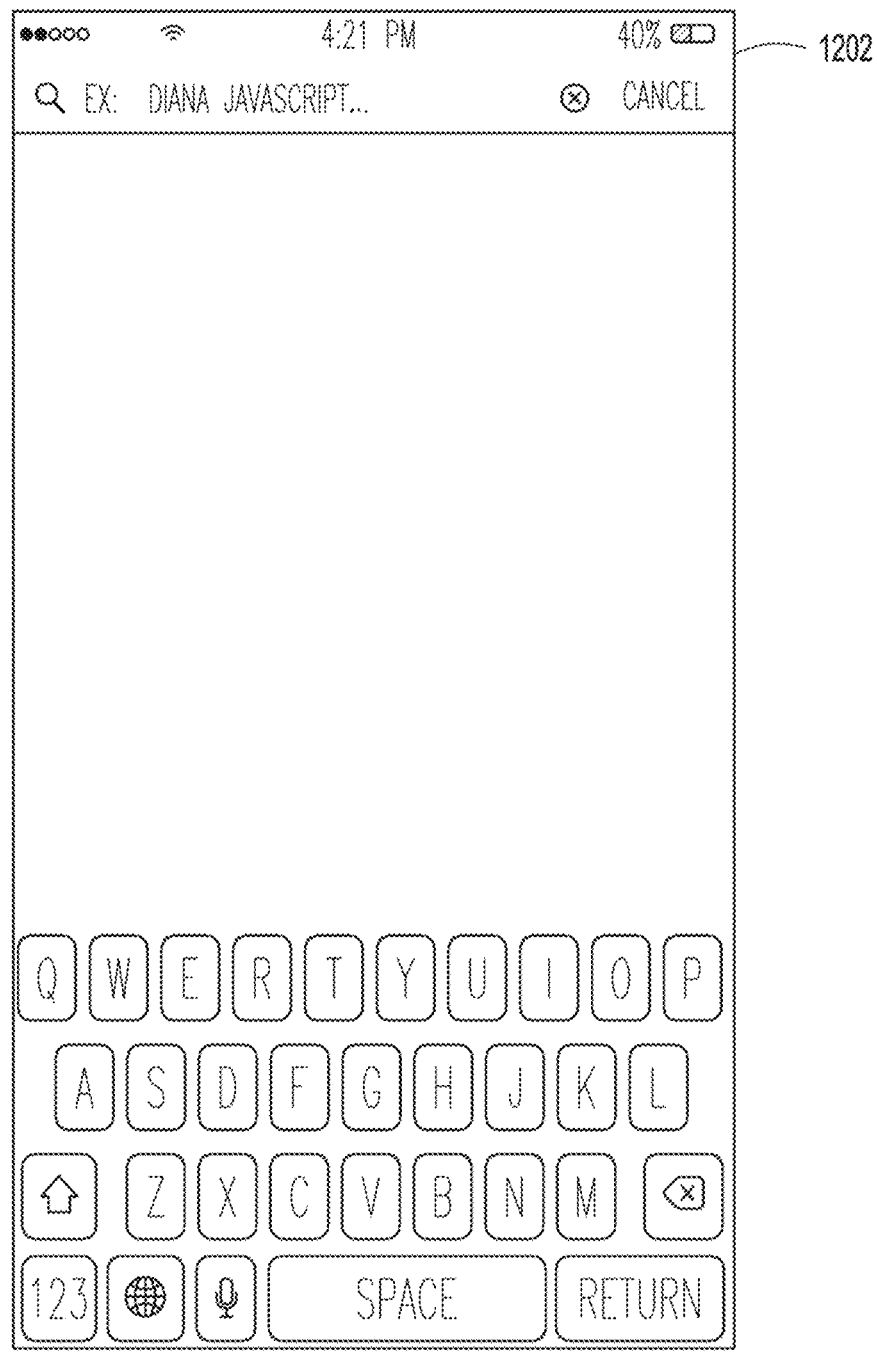

After the user is authenticated with the organizational directory server 112, the client device 104 further displays a graphical user interface for receiving a search query from the user 126 (Operation 1652). FIG. 10 illustrates a graphical user interface 1002, according to one embodiment, for receiving a search query from the user 126. In one embodiment, the graphical user interface 1002 includes an input element 1004 for receiving the search query, which may include any number of alphanumeric characters. FIG. 1102 illustrates another graphical user interface 1102, according to another embodiment, for receiving the search query. Like the graphical user interface 1002, the graphical user interface 1102 also includes an input element 1104. As shown in FIG. 11, the graphical user interface 1102 may also display the status of importing the packaged database 328 as the local profile database 222. FIG. 12 illustrates a graphical user interface 1202, according to one embodiment, where the importing of the packaged database 328 is complete.

As discussed previously, the organizational directory access client may employ a "search as you type" model of searching the local profile database 222. Accordingly, as the graphical user interface 1102 and/or the graphical user interface 1002 receives the inputted search query (Operation 1654), the client device 104 may first conduct a search of the local profile database 222 given a partial search query (Operation 1656). As discussed above, one or more modules 208 of the client device 104 are configured to perform the partial search, such as the local search module 212 (Operation 1656). As also explained previously, and in one embodiment, the local search module 212 is configured to search the local profile database 222 each time a new alphanumeric character is provided via the input element 1004 and/or input element 1104, such that each successive alphanumeric character is treated as a different search query.

Figure 13:
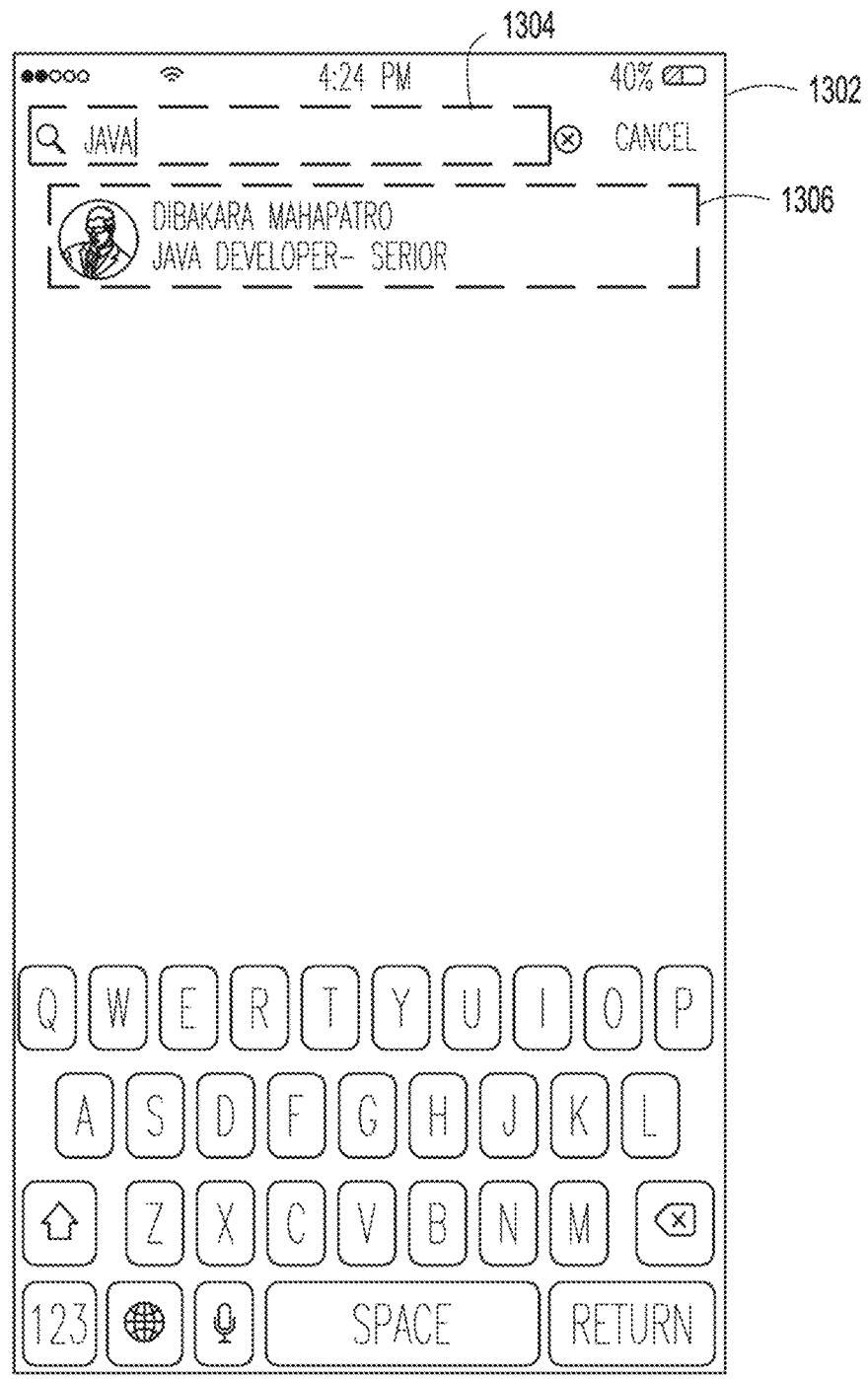

As the partial search is performed, the search results (e.g., local search results 226) are displayed by the client device 104 (Operation 1658). FIG. 13 illustrates a graphical user interface 1302, according to one embodiment, where local search results 226 are displayed as search results 1306. FIG. 13 also shows that a search query has been input into the input element 1304. As shown in FIG. 13, the search query is "Java," which, in one embodiment, is treated as four separate partial search queries, namely, "J," "Ja," "Jav," and, "Java." One of ordinary skill in the art will recognize that duplicate search results may be omitted from the search results 1306.

Referring back to FIG. 16E, after the user 126 has provided the search query, the user 126 may indicate that the search query is a complete search query. For example, the user 126 may select a graphical element, such as a graphical button labeled "return" of a graphically displayed keyboard. After the user 126 indicates that the search query is complete, and in one embodiment, the client device 104 communicates the complete search query to the organizational directory server 112 and/or one or more database servers 116, such as the social networking server 118 (Operation 1660). As discussed previously, one or more modules 208 of the client device 104 are configured to communicate and/or handle the network search, such as the network search module 214.

Figure 16F:
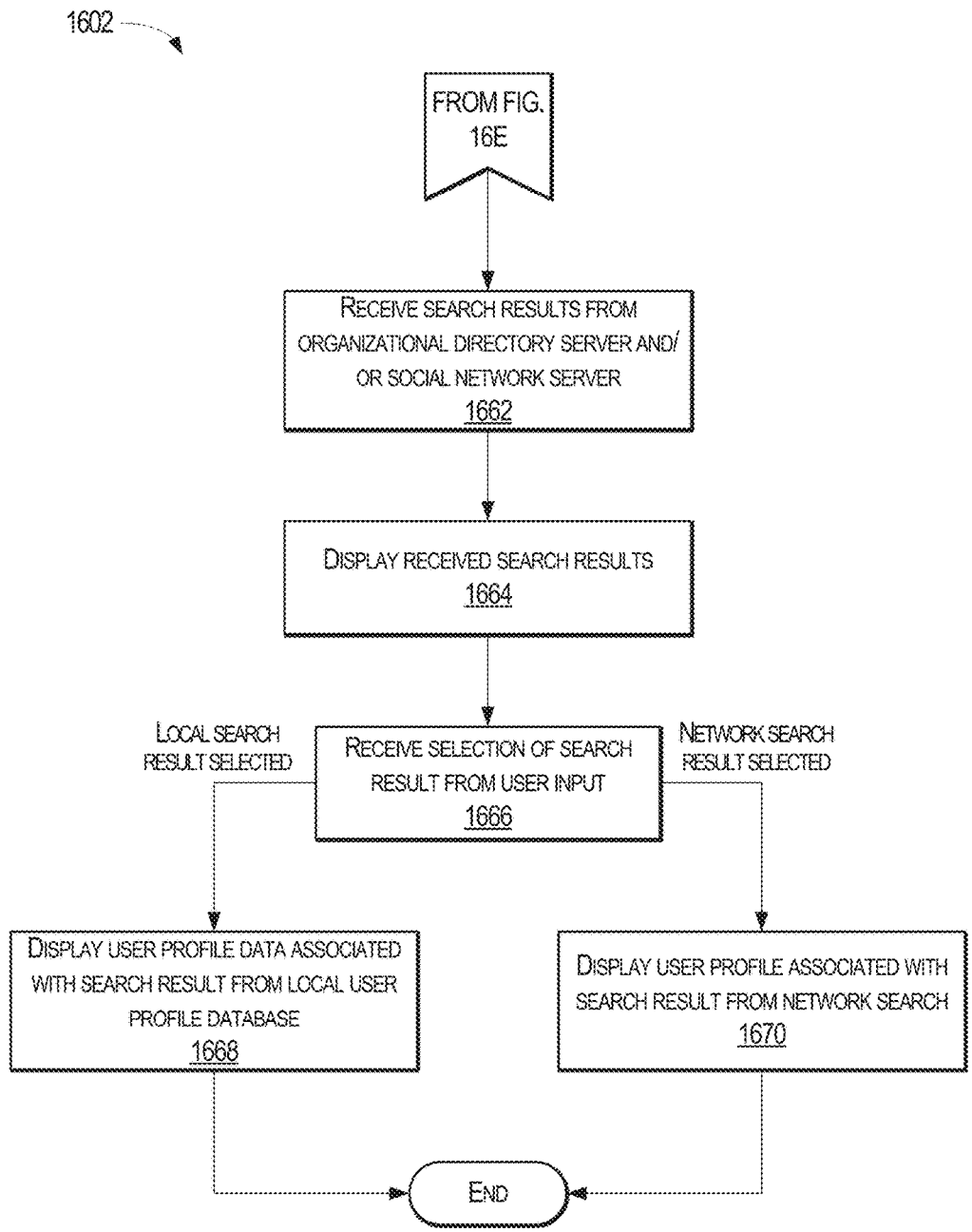

The organizational directory server 112 and/or the database servers 116 then conduct the search using the search query provided by the client device 104. In one embodiment, such a search is conducted using search techniques known in the art. Referring to FIG. 16F, the client device 104 then receives the search results from the organizational directory server 112 and/or the database servers 116 (Operation 1662). In one embodiment, the received search results (e.g., network search results 228) include member profile information from the organizational directory 122 and/or the social networking profiles 120. Further still, one or more of the network search results 228 may be duplicative of the local search results 226, in which case, such duplicative search results are removed. In one embodiment, the client device 104 is configured to remove the duplicative search results. In another embodiment, the organizational directory server 112 and/or the social networking server 118 is configured to remove such duplicative search results.

Figure 14:
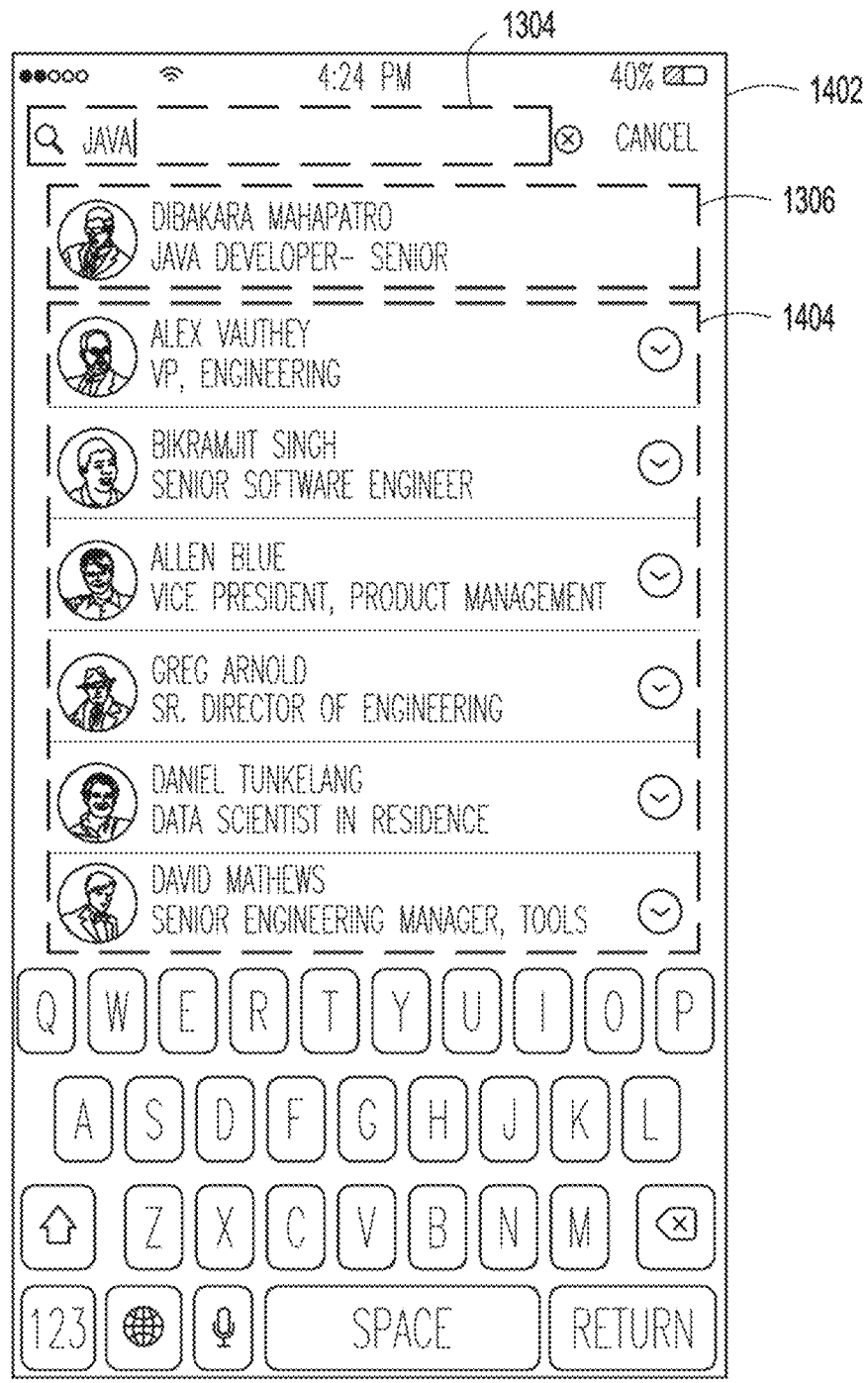

The client device 104 then displays the network search results 228 (Operation 1664). FIG. 14 illustrates a graphical user interface 1402, according to one embodiment, where the network search results 228 are displayed as search results 1404 alongside the search results 1306 from the search of the local profile database 222. In one embodiment, the displayed search results 1404 include results obtained from the organizational directory server 112, the social networking server 118, or combinations thereof.

Figure 15:
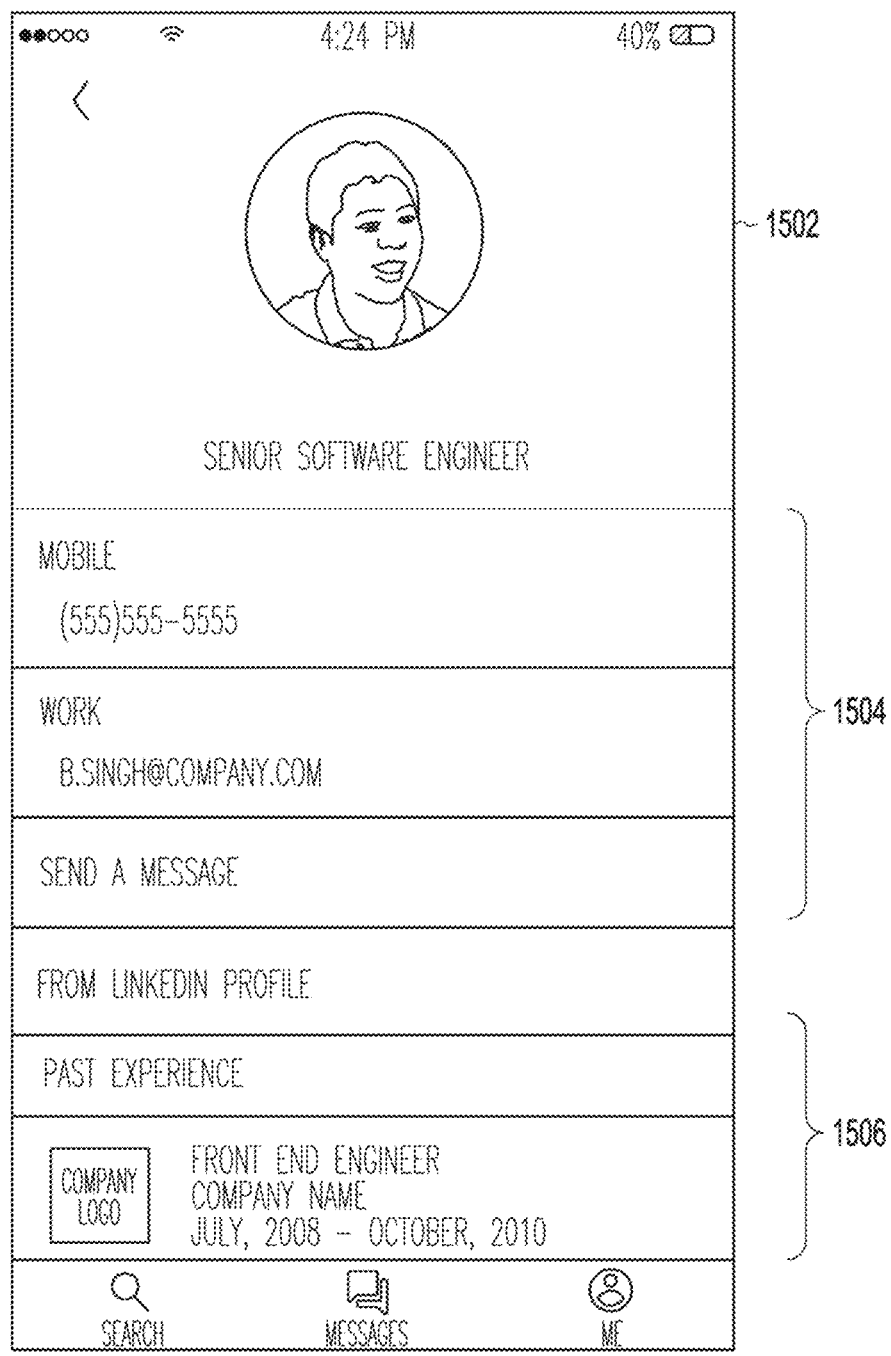

A user may then select one or more of the search results 1306,1404 (Operation 1666). Where a local search result is selected (e.g., a search result selected from search results 1306), the client device 104 is configured to display the member profile corresponding to the selected search result (Operation 1668). Similarly, where the network search result is selected (e.g., a search result selected from search results 1404), the client device 104 is configured to display the member profile corresponding to the selected search result (Operation 1670). FIG. 15 illustrates a graphical user interface 1502, according to one embodiment, for displaying a selected search result. The graphical user interface 1502 may be leveraged for displaying a search result selected from the search results 1306 and/or the search results 1404. As shown in FIG. 15, the graphical user interface 1502 may display organizational contact information 1504 associated with the selected search result. In one embodiment, the organizational contact information 1504 is preconfigured by an administrator of the organizational directory server 112 and is included in a member profile of the organizational directory 122. In addition, the graphical user interface 1502 may display social networking information 1506 associated with the selected search result. As discussed previously, the social networking information 1506 may be obtained by the organizational directory server 112 when the organizational directory server 112 builds the packaged database 328. In an alternative embodiment, the social networking information 1506 is obtained as part of the network search results 228 and incorporated into the display of the search results on the graphical user interface 1402. For example, the client device 104 may modify one or more member profiles of the local profile database 222 to accommodate and/or incorporate the social networking information when obtained by the network search module 214.

In this manner, the disclosed organizational directory access client and organizational directory server provide a unique approach to searching for members of an organization. As discussed above, the organizational directory access client employs a two-pronged approach to conducting the search: a local search of a local profile database, which is previously configured and packaged by the organizational directory server, and a network search of member profiles using web-based services (e.g., SOA-based services, ROA-based services, web APIs, etc.) provided by the organizational directory server 112 and/or one or more database servers 116. This two-pronged approach is particularly helpful in situations where an Internet connection is not available but a cellular network is; as the user may have already updated the organizational directory access client with a local profile database, the user can leverage the local search to find a contact number for a member of the organization and then call that person using the available cellular network. As evident from this disclosure, the technical benefit to this approach is that the local search provides search results faster than if network searching was only used, the disclosed systems and methods use limited resources when needed (e.g., if an Internet connection is not available), and can incorporate information from many different sources of member profile information, whether that information is provided by the organization or a social network.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-16E are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Example Machine Architecture and Machine-Readable Medium

Figure 17:
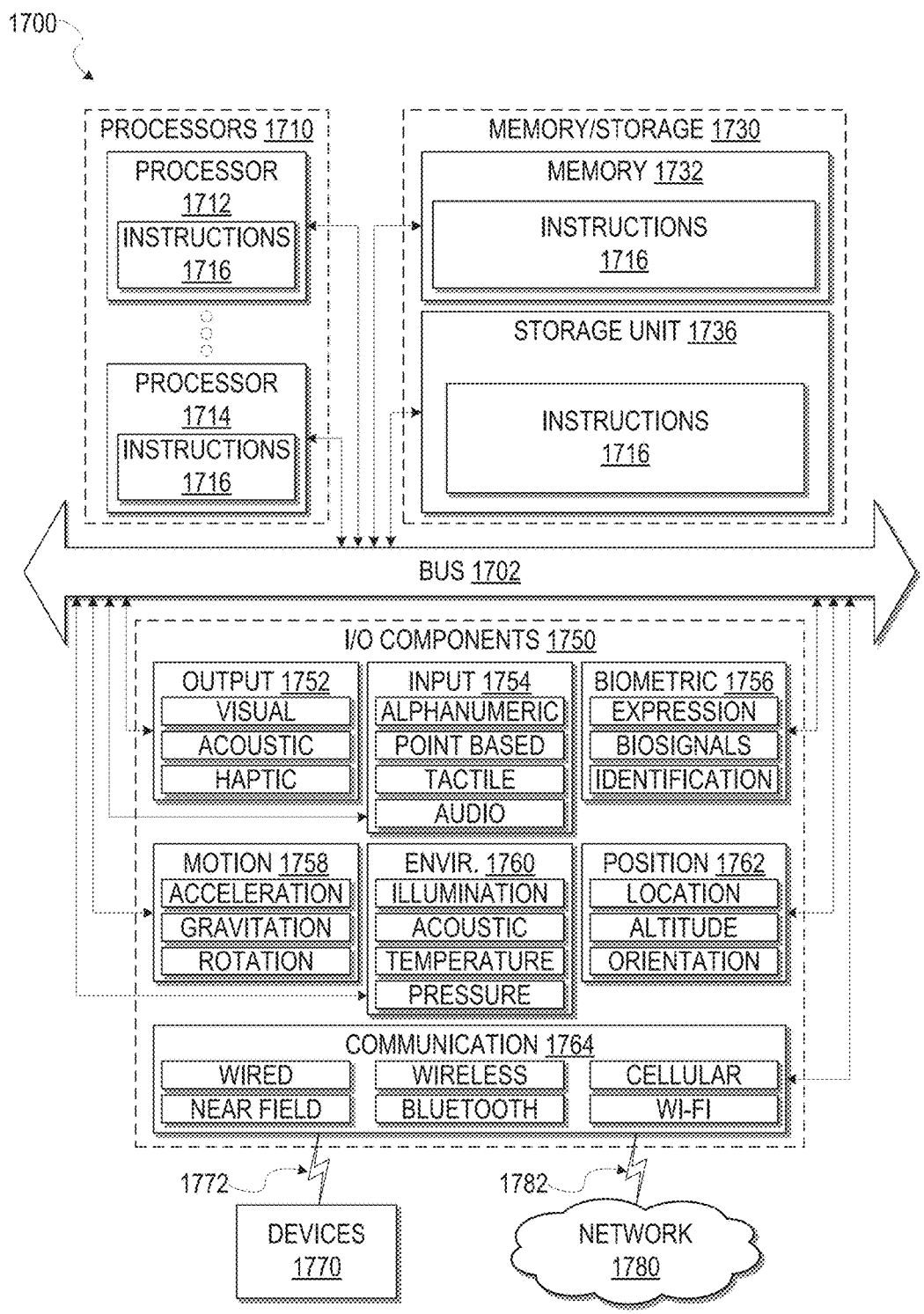
FIG. 17 is a block diagram illustrating components of a machine, according to some example embodiments, able to read instructions from a machine-readable medium (e.g., a machine-readable storage medium) and perform any one or more of the methodologies discussed herein.

FIG. 17 is a block diagram illustrating components of a machine 1700, according to some example embodiments, able to read instructions from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1716 (e.g., software, a program, an application, an applet, an app, or other executable code) for causing the machine 1700 to perform any one or more of the methodologies discussed herein may be executed. For example the instructions may cause the machine to execute the flow diagrams of FIGS. 16A-16E. Additionally, or alternatively, the instructions may implement one or more of the components of FIGS. 2-3. The instructions transform the general, non-programmed machine into a particular machine programmed to carry out the described and illustrated functions in the manner described. In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a personal digital assistant (PDA), or any machine capable of executing the instructions 1716, sequentially or otherwise, that specify actions to be taken by machine 1700. Further, while only a single machine 1700 is illustrated, the term "machine" shall also be taken to include a collection of machines 1700 that individually or jointly execute the instructions 1716 to perform any one or more of the methodologies discussed herein.

The machine 1700 may include processors 1710, memory 1730, and I/O components 1750, which may be configured to communicate with each other such as via a bus 1702. In an example embodiment, the processors 1710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1712 and processor 1714 that may execute instructions 1716. The term "processor" is intended to include multi-core processor that may comprise two or more independent processors (sometimes referred to as "cores") that may execute instructions contemporaneously. Although FIG. 17 shows multiple processors, the machine 1700 may include a single processor with a single core, a single processor with multiple cores (e.g., a multi-core process), multiple processors with a single core, multiple processors with multiples cores, or any combination thereof.

The memory/storage 1730 may include a memory 1732, such as a main memory, or other memory storage, and a storage unit 1736, both accessible to the processors 1710 such as via the bus 1702. The storage unit 1736 and memory 1732 store the instructions 1716 embodying any one or more of the methodologies or functions described herein. The instructions 1716 may also reside, completely or partially, within the memory 1732, within the storage unit 1736, within at least one of the processors 1710 (e.g., within the processor's cache memory), or any suitable combination thereof, during execution thereof by the machine 1700. Accordingly, the memory 1732, the storage unit 1736, and the memory of processors 1710 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1716. The term "machine-readable medium" shall also be taken to include any medium, or combination of multiple media, that is capable of storing instructions (e.g., instructions 1716) for execution by a machine (e.g., machine 1700), such that the instructions, when executed by one or more processors of the machine 1700 (e.g., processors 1710), cause the machine 1700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1750 may include a wide variety of components to receive input, provide output, produce output, transmit information, exchange information, capture measurements, and so on. The specific I/O components 1750 that are included in a particular machine will depend on the type of machine. For example, portable machines such as mobile phones will likely include a touch input device or other such input mechanisms, while a headless server machine will likely not include such a touch input device. It will be appreciated that the I/O components 1750 may include many other components that are not shown in FIG.

17. The I/O components 1750 are grouped according to functionality merely for simplifying the following discussion and the grouping is in no way limiting. In various example embodiments, the I/O components 1750 may include output components 1752 and input components 1754. The output components 1752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1750 may include biometric components 1756, motion components 1758, environmental components 1760, or position components 1762 among a wide array of other components. For example, the biometric components 1756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1758 may include acceleration sensor components (e.g., accelerometer), gravitation sensor components, rotation sensor components (e.g., gyroscope), and so forth. The environmental components 1760 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1750 may include communication components 1764 operable to couple the machine 1700 to a network 1780 or devices 1770 via coupling 1782 and coupling 1772 respectively. For example, the communication components 1764 may include a network interface component or other suitable device to interface with the network 1780. In further examples, communication components 1764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1770 may be another machine or any of a wide variety of peripheral devices (e.g., a peripheral device coupled via a Universal Serial Bus (USB)).

Moreover, the communication components 1764 may detect identifiers or include components operable to detect identifiers. For example, the communication components 1764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1764, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1780 or a portion of the network 1780 may include a wireless or cellular network and the coupling 1782 may be a Code Division Multiple Access (CDMA) connection, a Global System for Mobile communications (GSM) connection, or other type of cellular or wireless coupling. In this example, the coupling 1782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1716 may be transmitted or received over the network 1780 using a transmission medium via a network interface device (e.g., a network interface component included in the communication components 1764) and utilizing any one of a number of well-known transfer protocols (e.g., hypertext transfer protocol (HTTP)). Similarly, the instructions 1716 may be transmitted or received using a transmission medium via the coupling 1772 (e.g., a peer-to-peer coupling) to devices 1770. The term "transmission medium" shall be taken to include any intangible medium that is capable of storing, encoding, or carrying instructions 1716 for execution by the machine 1700, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
a non-transitory, machine-readable medium storing computer-executable instructions; and
at least one hardware processor communicatively coupled to the non-transitory, machine-readable medium that, when the computer-executable instructions are executed, the at least one hardware processor is configured to:
receive member profile information from a client device, the member profile information corresponding to a member of an organization;
retrieve a plurality of member profiles from a member profile database associated with the organization;
package the plurality of member profiles into a transmittable member profile database, the packaged transmittable member profile database being in a predetermined file format;
transmit the packaged transmittable member profile database to the client device; and
during transmission of the packaged transmittable member profile database, modify a portion of the packaged transmittable member profile database in response to a determination that the portion should be modified according to a previously established user preference.

2. The system of claim 1, wherein the at least one hardware processor is further configured to:
receive an organizational identifier corresponding to the member of the organization;
generate a first access code in response to the received organizational identifier, the first access code comprising a plurality of alphanumeric characters;
transmit a first access code to the member using the organizational identifier;
receive a second access code; and
authorize the member to receive the packaged second member profile database based on a comparison of the first access code and the received second access code.

3. The system of claim 1, wherein the transmittable member profile database includes a subset of the plurality of member profiles.

4. The system of claim 1, wherein the at least one hardware processor is further configured to:
re-package the transmittable member profile database in response to a detected change to the member profile database; and
transmit the re-packaged transmittable member profile database to the client device.

5. The system of claim 1, wherein the re-packaged transmittable member profile database comprises updates to the packaged transmittable member profile database previously transmitted to the client device.

6. The system of claim 1, wherein modifying the portion of the packaged transmittable member profile database includes writing one or more NULL values to the portion.

7. The system of claim 1, wherein modifying the portion of the packaged transmittable member profile database includes preventing the transmission of the portion of the packaged transmittable member profile database.

8. A method comprising:
receiving, with at least one hardware processor, member profile information from a client device, the member profile information corresponding to a member of an organization;
retrieving, with the at least one hardware processor, a plurality of member profiles from a member profile database associated with the organization;
packaging, with the at least one hardware processor, the plurality of member profiles into a transmittable member profile database, the packaged transmittable member profile database being in a predetermined file format;

transmitting, with the at least one hardware processor, the packaged transmittable member profile database to the client device; and during transmission of the packaged transmittable member profile database, modifying, with the at least one hardware processor, a portion of the packaged transmittable member profile database in response to a determination that the portion should be modified according to a previously established user preference.

9. The method of claim 8, further comprising:
receiving an organizational identifier corresponding to the member of the organization;
generating a first access code in response to the received organizational identifier, the first access code comprising a plurality of alphanumeric characters;
transmitting a first access code to the member using the organizational identifier;
receiving a second access code; and
authorizing the member to receive the packaged second member profile database based on a comparison of the first access code and the received second access code.

10. The method of claim 8, wherein the transmittable member profile database includes a subset of the plurality of member profiles.

11. The method of claim 8, further comprising:
re-packaging the transmittable member profile database in response to a detected change to the member profile database; and
transmitting the re-packaged transmittable member profile database to the client device.

12. The method of claim 11, wherein the re-packaged transmittable member profile database comprises updates to the packaged transmittable member profile database previously transmitted to the client device.

13. The method of claim 8, wherein modifying the portion of the packaged transmittable member profile database includes writing one or more NULL values to the portion.

14. The method of claim 8, wherein modifying the portion of the packaged transmittable member profile database includes preventing the transmission of the portion of the packaged transmittable member profile database.

15. A non-transitory, machine-readable medium having computer-executable instructions stored thereon that, when executed by at least one hardware processor, causes the at least one hardware processor to perform a plurality of operations, the operations comprising:
receiving, with at least one hardware processor, member profile information from a client device, the member profile information corresponding to a member of an organization;

retrieving, with the at least one hardware processor, a plurality of member profiles from a member profile database associated with the organization;
packaging, with the at least one hardware processor, the plurality of member profiles into a transmittable member profile database, the packaged transmittable member profile database being in a predetermined file format;
transmitting, with the at least one hardware processor, the packaged transmittable member profile database to the client device; and
during transmission of the packaged transmittable member profile database, modifying, with the at least one hardware processor, a portion of the packaged transmittable member profile database in response to a determination that the portion should be modified according to a previously established user preference.

16. The non-transitory, machine-readable medium of claim 15, wherein the operations further comprise:
receiving an organizational identifier corresponding to the member of the organization;
generating a first access code in response to the received organizational identifier, the first access code comprising a plurality of alphanumeric characters;
transmitting a first access code to the member using the organizational identifier;
receiving a second access code; and
authorizing the member to receive the packaged second member profile database based on a comparison of the first access code and the received second access code.

17. The non-transitory, machine-readable medium of claim 15, wherein the transmittable member profile database includes a subset of the plurality of member profiles.

18. The non-transitory, machine-readable medium of claim 15, wherein the operations further comprise:
re-packaging the transmittable member profile database in response to a detected change to the member profile database; and
transmitting the re-packaged transmittable member profile database to the client device.

19. The non-transitory, machine-readable medium of claim 15, wherein modifying the portion of the packaged transmittable member profile database includes writing one or more NULL values to the portion.

20. The non-transitory, machine-readable medium of claim 15, wherein modifying the portion of the packaged transmittable member profile database includes preventing the transmission of the portion of the packaged transmittable member profile database.

* * * * *